US012762346B2

(12) United States Patent
Ricketts et al.

(10) Patent No.: US 12,762,346 B2
(45) Date of Patent: Oct. 13, 2026

(54) SYSTEM AND METHOD FOR AUTOMATED DECISION MAKING

(71) Applicant: IMPACT RI LIMITED, Woodstock (GB)

(72) Inventors: Mark Steven Ricketts, Woodstock (GB); Jonathan Richard Fielder-White, Woodstock (GB); Denise Barnes, Woodstock (GB)

(73) Assignee: IMPACT RI LIMITED, Woodstock (GB)

( * ) Notice: Subject to any disclaimer, the term of this patent is extended or adjusted under 35 U.S.C. 154(b) by 1308 days.

(21) Appl. No.: 17/355,042

(22) Filed: Jun. 22, 2021

(65) Prior Publication Data

US 2021/0390263 A1 Dec. 16, 2021

Related U.S. Application Data

(63) Continuation-in-part of application No. 15/499,208, filed on Apr. 27, 2017, now abandoned.

(60) Provisional application No. 62/328,541, filed on Apr. 27, 2016.

(51) Int. Cl.

| | |
|---|---|
| ***G06F 40/30*** | (2020.01) |
| ***G06F 40/166*** | (2020.01) |
| ***G06N 20/00*** | (2019.01) |

(52) U.S. Cl.

CPC ............ *G06F 40/30* (2020.01); *G06F 40/166* (2020.01); *G06N 20/00* (2019.01)

(58) Field of Classification Search

CPC ......... G06Q 10/00; G06Q 50/26; G06Q 10/10

See application file for complete search history.

(56) References Cited

U.S. PATENT DOCUMENTS

| | | | | |
|---|---|---|---|---|
| 9,832,159 | B1 | 11/2017 | Kursun et al. | |
| 2008/0215541 | A1* | 9/2008 | Li | G06F 16/951 |
| 2009/0063635 | A1 | 3/2009 | Pierce et al. | |
| 2010/0185498 | A1* | 7/2010 | Bechtel | G06Q 10/10 705/7.33 |
| 2012/0016678 | A1* | 1/2012 | Gruber | G06F 40/40 704/E21.001 |
| 2012/0185484 | A1 | 7/2012 | Jones et al. | |
| 2013/0097178 | A1* | 4/2013 | Song | G06Q 50/10 707/748 |
| 2013/0097245 | A1 | 4/2013 | Adarraga | |
| 2014/0032426 | A1 | 1/2014 | Tozzi | |
| 2015/0120718 | A1* | 4/2015 | Luo | G06F 16/335 707/728 |
| 2016/0026629 | A1 | 1/2016 | Clifford et al. | |

(Continued)

OTHER PUBLICATIONS

Micro et al. ("Using Randomization to Attack Similarity Digests". ATIS 2014, CCIS 490, pp. 199-210, 2014) (Year: 2014).*

*Primary Examiner* — Imad Kassim

(74) *Attorney, Agent, or Firm* — Alpine Patents LLC; Brian Van Osdol

(57) ABSTRACT

A system and method that includes receiving a problem request and publishing the problem request through a computing platform; accepting a set of responses to the problem request during an ideation stage; at a similarity engine of the computing platform, consolidating the set of responses to a set of base responses; retrieving judgments on base response comparisons of the set of base responses during a judgment stage; and generating a response report for the problem request.

15 Claims, 26 Drawing Sheets

(56) References Cited

U.S. PATENT DOCUMENTS

| | | | |
|---|---|---|---|
| 2016/0029368 | A1 | 1/2016 | Borenstein et al. |
| 2016/0380941 | A1 | 12/2016 | Tanurdjaja et al. |
| 2017/0060960 | A1* | 3/2017 | Kim ...................... G06F 16/335 |
| 2017/0103194 | A1* | 4/2017 | Wechsler .............. G06F 21/316 |
| 2017/0140474 | A1* | 5/2017 | Tran ............... G06Q 10/063112 |
| 2017/0154281 | A1* | 6/2017 | Ho ........................ G06F 16/285 |

* cited by examiner

150

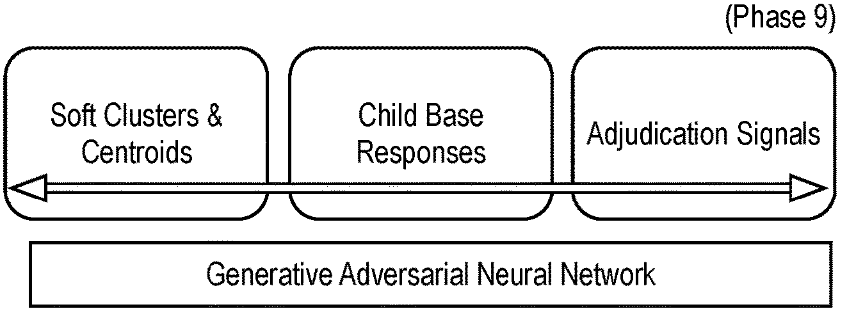
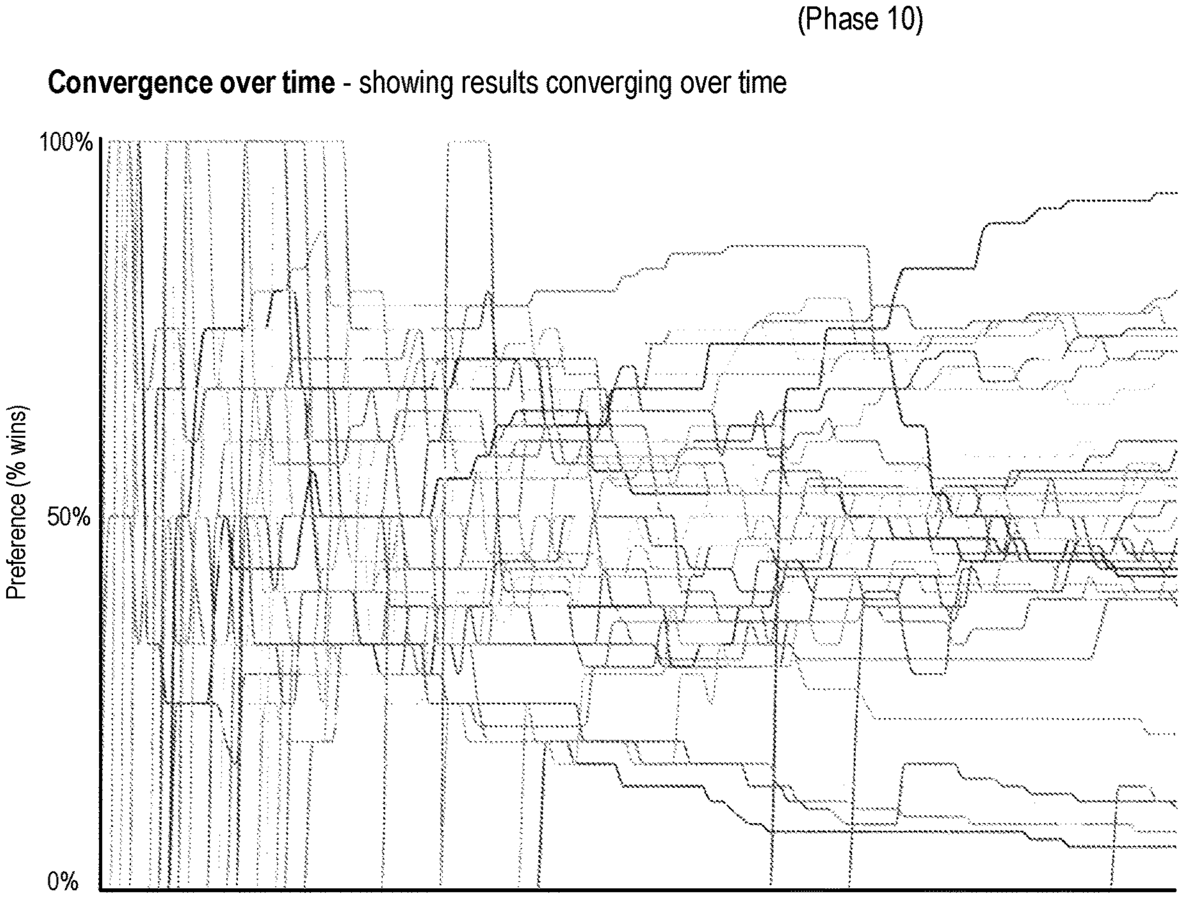
FIGURE 23

Cluster - 14296

*The opening up of retail and the pubs, bars and restaurants will be complementary to each other and give each other a major boost as shoppers are able to move around.*

- *Opening pubs, bars and restaurants outside only is a very sensible start to kick-starting this sector of the economy*
- *The travel and leisure sector is probably the hardest hit sector in the UK in particular and to kick start this sector will create a lot of jobs and assist hugely long suffering businesses*
- *The Re-opening of retail shops will also give that sector a massive boost and will give the high street a chance to compete again with on line shopping*
- *It is necessary for the economy to get people out of their houses again and spending money on the high street and in the leisure sector and in related service sectors such as busses trains and taxis*

FIGURE 24

SYSTEM AND METHOD FOR AUTOMATED DECISION MAKING

CROSS-REFERENCE TO RELATED APPLICATIONS

This Application is a continuation-in-part application of U.S. patent application Ser. No. 15/499,208, filed on 27 Apr. 2017, which claims the benefit of U.S. Provisional Application No. 62/328,541, filed on 27 Apr. 2016, both of which are incorporated in their entireties by this reference.

TECHNICAL FIELD

This invention relates generally to the field of decision-making tools, and more specifically to a new and useful system and method for with integrated natural language processing to provide automated decision making.

BACKGROUND

Decisions are made all the time, and poor decisions can cost businesses, organizations, and individuals time, money, stress, and regret. Commercial systems have been built to facilitate the decision making process. Some commercial systems have used a process known as analytical hierarchical process (AHP) in evaluating different options. However, such systems are limited by the number of options that can be processed for a given question since considering each idea using comparative judgement increases the processing time in a non-linear fashion. Crude filtering like up-voting and other human polling interactions, indexing and coding are sometimes used to simplify the processing and consideration of ideas. The effect of these additional filtering processes is considerable delays, such that the decisions under consideration require the inefficient use of many people. Instead of normal decision time-frames being seconds, minutes, or hours, current systems often require weeks or even months to reach tangible outcomes especially where they are required to represent the consensus of larger or remote groups. Additionally, fully automated systems that rely heavily or entirely on algorithmic approaches reduce human participation, or reduce it to entirely to inferred responses rather than real and thus may result in reduced user acceptance of the results. Thus, there is a need in the decision-making tools field to create a new and useful system and method for automated decision-making. This invention provides such a new and useful system and method.

BRIEF DESCRIPTION OF THE FIGURES

FIGS. 20-23 are detailed schematic representations of various phases of consolidation;

FIG. 24 is an exemplary representation illustrating use of clusters and data structure in memory storage for digital fingerprinting;

DESCRIPTION OF THE EMBODIMENTS

Figure 1:
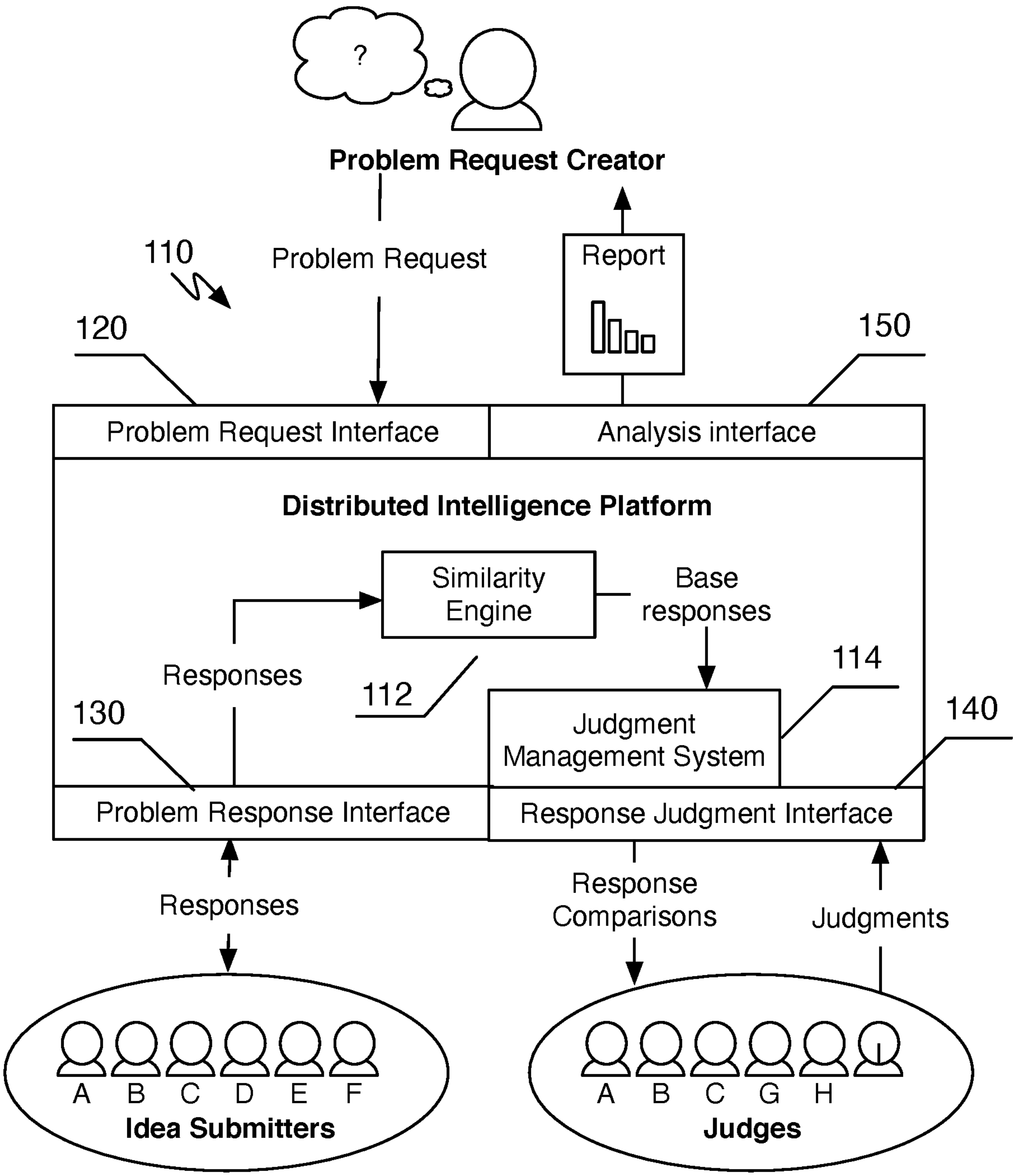
FIG. 1 is a schematic representation of the system of a preferred embodiment.

The following description of the embodiments of the invention is not intended to limit the invention to these embodiments but rather to enable a person skilled in the art to make and use this invention.

1. Overview

A system and method for automated decision making of a preferred embodiment can employ a distributed digital intelligence platform that manages a multi-stage process that performs coordinated distributed communication to a plurality of client devices when collecting possible solution inputs from an audience for a given challenge, applying machine learning models during dynamic organization of solution inputs into base options, and then selectively generating comparison challenges and collecting response input from a representative set of comparisons between the different base options. This process can be further enhanced through continuous updating the base options and collection of response inputs based on current state of collected response inputs. The system and method can use the comparisons indicating preferences between base responses, and indications of literal similarity in combination with response timing measured within the user interfaces, participant profiles, and/or other factors to produce an output.

The system and method can enable an automated service that enables compiling of large volumes of subjective natural language data input into a consolidated set of preferred representations of the data. The volumes of data input that can be processed may be effectively limitless. For example, the system and method can efficiently process hundreds of different natural language responses, but can similarly be used in efficiently processing tens or even hundreds of thousands of natural language responses. For example, the system and method may be used for time efficiently consolidating response inputs and collecting statistically significant preference data such that the system and method can synthesize an output of preferred responses at the same time as it curates linguistic similarity to avoid redundancy at the reporting stage. In some variations, the resulting output of the system and method includes machine-generated result responses that are optimized based on a machine-based deterministic analysis of the data (e.g., a non-subjective analysis).

The system and method may provide a number of potential benefits. The system and method are not limited to always providing such benefits and are presented only as exemplary representations for how the system and method may be put to use. The list of benefits is not intended to be exhaustive and other benefits may additionally or alternatively exist.

As one potential benefit, the system and method can promote participant ownership during problem resolution as notwithstanding the curation of redundancy, each unique idea remains part of the ideation process, even though it may be represented by another similar idea from time to time. Used in Factor Analysis this means that no descriptive element, which makes the Factor operant for Research process is lost. While it is easy for a participant to feel that his or her voice was not heard during traditional polls or votes, the method can also promote full participation at each stage and not being restricted to any particular language or form, the system works scientifically whilst maintaining the authentic expression of those voices. The method preferably operates while maintaining each unique idea within the process, which enables a large number of participants to submit ideas and have those ideas evaluated and considered and represented in the final Report. The method additionally includes a judgment stage that can use a comprehensive consensus of participants. Such mechanisms can enable participants to remain as stakeholders in the result with regard to preference judgements and the nature of meaning of ideas as expressed by the participant community, whether by a recognized language, or a particular professional or cultural speech community.

As another potential benefit, the method can scale participation such that any suitable number of people can participate. As one aspect that can contribute to scalability, the system and method uses consolidation of base responses through automated natural language processing combined with the iterative participant responses, processed by a Generative Adversarial Neural Network. For example, thousands of responses may be collected, but the system and method can avoid individual analysis by consolidating and reducing those responses to representative base responses that can more efficiently be analyzed by the available audience whilst avoiding duplication or redundancy but without losing the precise literal detail necessary for deciding between causal, diagnostic and predictive reasoning. Additionally, traditional approaches often place limits on the number of ideas to evaluate or the number of participants that can submit ideas, in part because evaluating ideas can scale at a nonlinear rate based on the number of ideas. There may traditionally be a lower limit of participation and an upper limit, which can severely limit the usefulness of these prior approaches. The method can operate efficiently while maintaining inclusive participation by the users. The method could be used by small groups. In some cases, the system could even work efficiently with a single participant that is self-evaluating different options. The method could similarly be used by large groups. For example, a large multinational corporation could deploy such a system and method in harnessing the collective intelligence of across their entire workforce.

As one potential benefit, the system and method's use of machine learning models can work across multiple languages. Similarity modeling performed through machine learning models and/or neural networks can operate agnostic to original languages. Furthermore, with generation of base responses using machine systems, judgment input comparing different responses can similarly be performed in different languages.

As another potential benefit, the system and method can automate the coordination of communication and interaction with hundreds or thousands of different client devices interacting simultaneously.

As another potential benefit, the system and method can use machine learning models for dynamically adjusting consolidation of responses and/or the pairing of base responses for judgement. Adjustments can be made in real-time in response to the current state of data. These adjustments can be made in response to and in a parallel with the operation of the system and method.

As another potential benefit, the system and method can improve over time. With use of machine learning models and/or other language based models, continued use of the system and method can provide further training data used to improve the operation in subsequent uses.

As another potential benefit, the system and method can be highly scalable for processing large volumes of input data. As discussed, the system and method can enable the analysis of preference for responses to a prompt when the pool of supplied response inputs include hundreds, thousands, or more different responses. Furthermore, the processing of such response input data can be configured for different levels of confidence and/or time windows. For example, consolidation of response inputs can dynamically adjust to achieve a required statistically significant output within a limited amount of time or curated amount of judgement input data.

As another potential benefit, the system and method can automatically collect judgement input with higher resolution on response inputs of higher preference. While the system and method can use machine learning consolidation for heightened efficiency, dynamic adjustment to consolidation can adapt consolidation in real-time to differentiate between variations of response inputs within a similar grouping. For example, a large body of hundreds of results may initially be consolidated into ten ideas. Upon identifying a strong trend for preference for a limited number of the ideas (e.g., one to three of the base ideas), then judgment can be expanded to a more detailed sub-base ideas of the limited number of ideas. A resulting output of base responses may indicate the preferential ranking of these sub-base ideas and other higher level options. This is particularly relevant to Factor Analysis where the initial consolidation may relate to individual ideas, and a subsequent consolidation reduced to match required Factor attributes only.

As another potential benefit, the method can promote efficient resolution of a problem request. As one aspect, the use of time based restrictions and metrics can be used to limit the time to resolve a problem. In many business situations, soliciting ideas from people can be an arduous task and very time consuming. The method can be used by an individual or a number of users and can be used synchronously or asynchronously without causing bias.

As another potential benefit, the system and method may be applied for gathering and synthesizing group intuition. As one approach addressing such a potential benefit, the system and method can utilize timing for characterizing responses. For example, responses that gather faster reaction times during pairwise comparisons may provide useful insights into the intuition of participants or indicate problems in the free text data in terms of understanding, and therefore indicate the need for clarification.

There are numerous applications of the method. In one preferred application, the system and method is used as a form of crowd intelligence across a population of participants to identify community relevant solutions and make comparisons of multi-community need. As one exemplary use case, the method could be used within a business to leverage the intelligence of their work force to efficiently resolve issues. As another exemplary use case, the method could be used within organizations or governments to arrive at consensus on various issues, and through its particular function identify and evaluate objections to any plan or any specific individual ideas under consideration.

In another preferred application, the system and method can be used in standardizing and automating the grading or evaluation of a large body of responses. For example, the system and method could be used in combination with an exam administered to a number of students where answers are provided in free-text form rather than multiple choice. The system and method could then be used by educators to score and grade the body of answers in a consistent manner. Such response grading could similarly be used in employee recruiting or other areas where a volume of responses could benefit from a systematic approach for grading and comparing, or comparison to employer preferred responses.

While there are numerous use cases where the method can be used within a group setting, the method may alternatively be used by an individual to evaluate his or her own thoughts to arrive at a decision.

Additionally, the system and method may be integrated with other systems. In one variation, the system and method can be integrated with a social networks and/or a knowledge base. In another variation, the system and method could be integrated with an artificial intelligence analysis platform for combining crowd intelligence with artificial intelligence.

2. System

As shown in FIG. 1, a system for automated synthesis of distributed natural language response inputs of a preferred embodiment can include a distributed intelligence platform 110 that interfaces with a first set of client devices including a problem request interface 120, a second set of client devices including a problem response interface 130, a third set of client devices including a response judgment interface 140, and at least one client device including a reporting interface 150. The various client devices may include or operate one or more of the discussed interfaces at different times during operation of the system. For example, one client device may at different times operate two or more of the different interfaces such as a problem response interface 130 at one stage and a response judgment interface 140 at another stage.

The system is a specially configured computing system with a unique combination of user interface integrated data collection channels, machine learning models, and configured operation to enable computer synthesis and generation of a set of natural language responses to a given problem prompt and evaluation preferences simultaneously without pre-programming.

The system is preferably configured to execute and manage the method for a distributed intelligence process described herein. The distributed intelligence process preferably includes one or more stages of operation such as a challenge stage (e.g., for collecting problem or question), an ideation stage (e.g., for collecting ideas or possible solutions), a judgment stage (e.g., for assessing the ideas to identify one or more answer as preferred or considered similar), and/or a reporting stage (e.g., applying results of the process).

The distributed intelligence platform 110 functions to manage user interactions and data processing. The distributed intelligence platform 110 is preferably implemented as network accessible web and/or native application, wherein multiple parties can participate with the distributed intelligence platform 110. The distributed intelligence platform 110 preferably includes the operation of one or more specially configured computer servers. More specifically, the distributed intelligence platform 110 can include one or more microservices hosted in a remote computing environment.

As discussed in more detail below, the distributed intelligence platform 110 can include a response processor 112 and/or judgment management system 114. The response processor 112 and judgment management system 114 are sub-components or modules of the distributed intelligence platform 110, which can facilitate: processing and transformation of data, digital communication and collection of prompts and inputs, and synthesis of a resulting output. In some variations, the system is a computer-implemented tool to transform a large number (e.g., over a hundred or over a thousand) natural language response inputs into a reduced representation of response inputs that are synthesized from user responses. The reduced representation of response inputs can be described as the resulting base responses. The resulting base responses can be a uniquely computer generated result that forms a distinct set of base responses that consolidate the pool of initial response inputs with balanced and non-subjective incorporation of all user input for a current problem prompt and, optionally, previous problem prompts. The system depends on the use of one or more natural language-based machine learning models updated and used in operation of the system which are configured for operation by the system responding to the Participant's language by a micro service configured for that purpose.

Additionally, the machine learning model based approach enables a fair test that can measure the state of consensus and determine when a judgement stage satisfies a metric based condition and can then end. In one variation, during a judgement stage, the consolidated base responses can be iteratively refined and updated while collecting response inputs. In an exemplary implementation, the preference ranking of base responses will fluctuate with higher variability early on during the judgement stage and then will slowly settle to low variability as response input is collected and the grouping of base responses are adjusted according to collective input and therefore converge to the probabilistic evaluation of the base response as a valid answer to the problem. Judgement input collected during the judgement stage can be used in updating the consolidation process implemented with the machine learning model, which beside preference and similarity information is measuring and monitoring the fluctuations and their gradual convergence as a machine signal used to determine the optimised stopping point for the process.

Participants, administrators, and/or other users preferably access the distributed intelligence platform 110 through a web-based user application and/or a native application (e.g., an application operable on a personal computing device such as a phone) operable on an instance of a client device. The access may be used to collect various forms of external input. The distributed intelligence platform 110 can additionally expose an administration interface through which configuration and settings of operation can be customized. For example, different instances of use may be customized for faster synthesis and consolidation to a final outputted set of base responses or alternatively for higher confidence in the response consolidation results. Additionally or alternatively various operations can be set through such an administration interface. Alternative implementations could be a distributed system implementation wherein multiple devices collectively operate.

An account system and permission engine of the distributed intelligence platform 110 may be set up to permit user interactions with any suitable user scope. In one implementation, the distributed intelligence platform 110 can enable businesses to setup entity accounts wherein each entity account may have multiple participants register as users. In another implementation, the distributed intelligence platform 110 may be setup as a private system that operates within a private network of an entity. In another implementation, the distributed intelligence platform 110, may be set up as an open system that operates within a public network of an entity or social media.

The distributed intelligence platform 110 preferably includes a number of interfaces to facilitate the various stages of the distributed intelligence process, such as the problem request interface 120, the problem response interface 130, the response judgment interface 140, and the reporting interface 150. The various interfaces are primarily described as graphical user interfaces, but could alternatively or additionally include programmatic interfaces for integrating with outside digital systems. For example, responses may not be participant-submitted but retrieved and provided through other outside services. Similarly, an application programming interface (API) could be used to enable problem requests, problem responses, and/or judgments to be accessed from other channels. The interfaces could additionally be completed in part or in their entirety over communication protocols such as SMS/MMS, email, or other suitable forms of communication. As discussed below, the interfaces are used to present specific prompts for collecting input, which is then used as data by the distributed intelligence platform 110 in subsequent processing and/or in generating an output.

The data integration between the distributed intelligence platform 110 and the various interfaces (e.g., problem request interface 120, problem response interface 130, and the response judgment interface 140.

Figure 2:
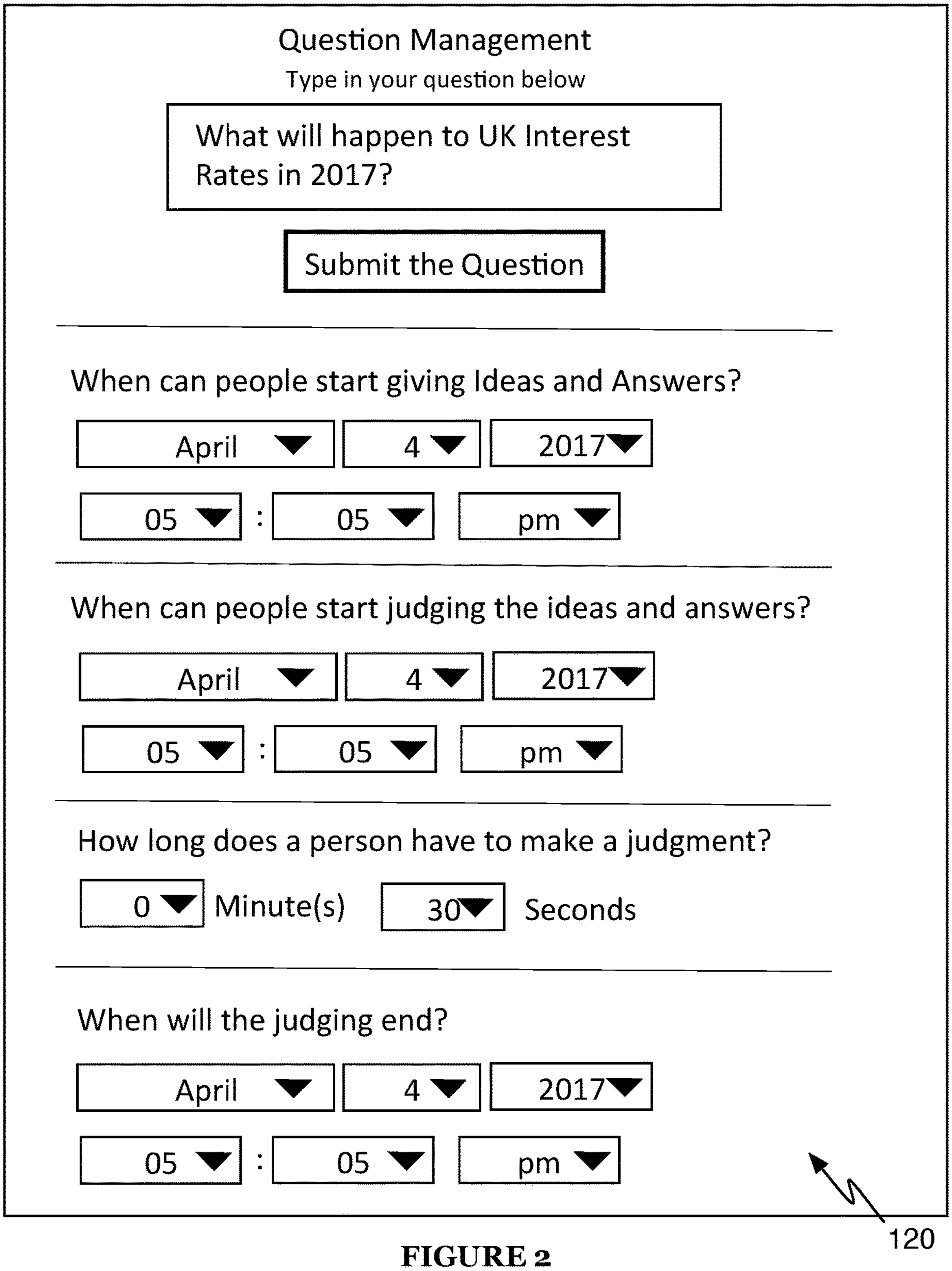
FIG. 2 is a schematic representation of an exemplary problem request interface.

As shown in FIG. 2, the problem request interface 120 functions as the interface for acquiring problem requests. Problem requests are preferably submitted by one or more user. A problem request preferably includes a description and/or additional media and metadata.

A problem request could additionally be configured with target audience properties. Target audience properties can specify participation policy for specific participants and/or participant characteristics (e.g., company department, job title, geographic location, participant demographics, etc.). Participation policy can allow, require, or deny participation or set any suitable access rule for a participant during the distributed intelligence process. Participation policy can additionally be specified for particular stages of the distributed intelligence process.

A problem request can additionally include process properties, response properties, and/or comparison properties.

Process properties can include problem timing, which may include: scheduling when the problem request is distributed or published; limiting the duration of the various stages; setting other conditions on the stages such as number of response conditions or conditions for the number/volume of response comparisons; and/or other suitable settings. In one variation, the settings for the consolidation process applied to the collected responses can be configured. For example, the number of base responses can be limited to below a certain number.

Response property settings can include character, word, or other size limits; content properties; time window to submit a response; and/or other properties or rules relating to a response.

Comparison properties preferably relate to the judgment stage wherein responses are compared (preferably as pairwise comparisons). Comparison properties can alter the way base responses or their original source responses are presented. Comparison properties could also alter the type of responses such as allowing selection of only one, selecting prefer both, prefer neither, and/or other options.

Figure 3:
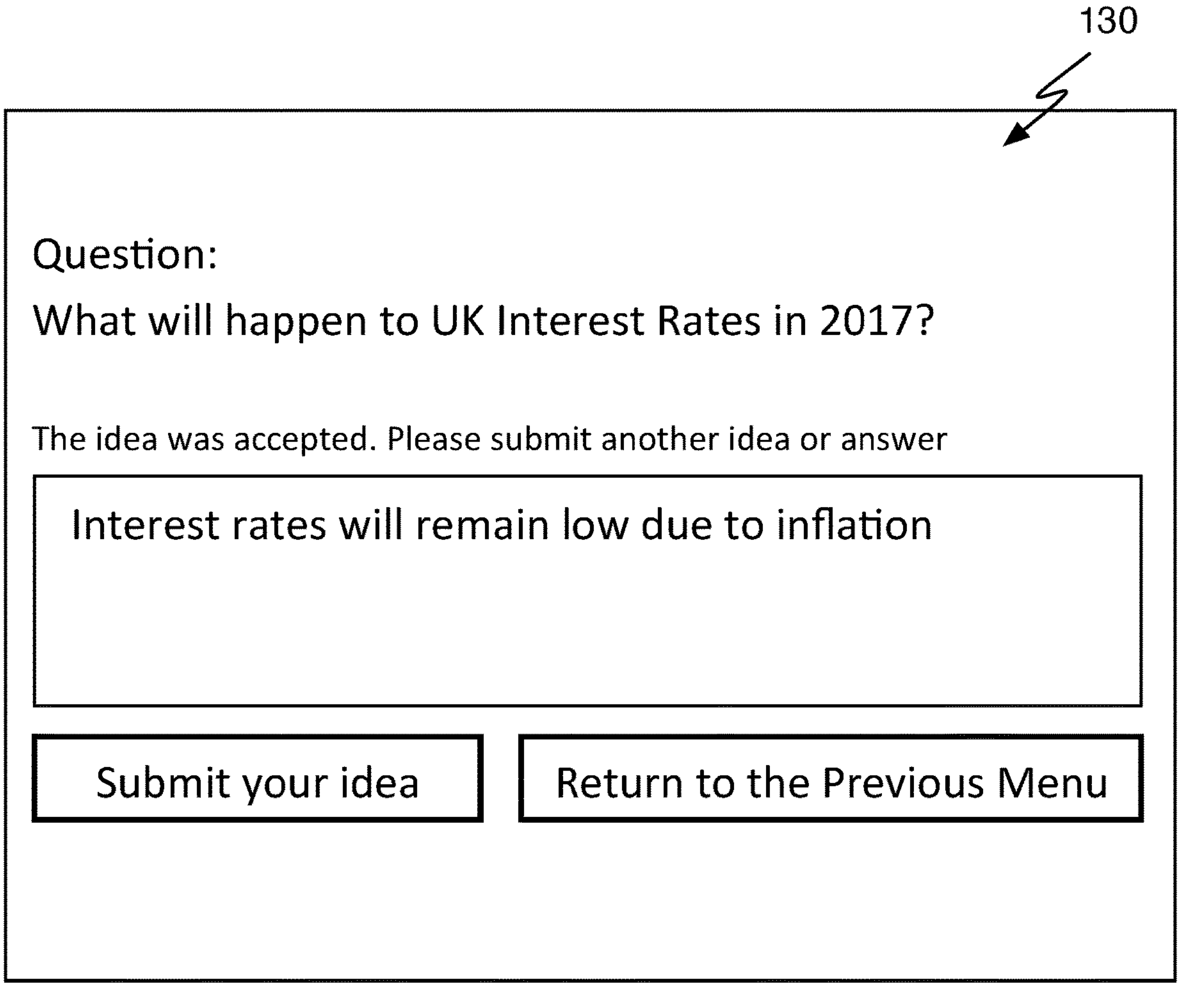
FIG. 3 is a schematic representation of an exemplary problem response interface.

As shown in FIG. 3, the problem response interface 130 functions as an interface for collecting participant ideas. In particular, the problem response interface 130 is used in collecting natural language problem response inputs. A large number of natural language problem response inputs can be collected, which can then be used as the pool of response inputs that can be consolidated, judged and synthesized into a resulting set of base responses. These consolidations are effectively the grouping of similar meaning as understood by the participant community and are therefore not limited to any particular language. A problem response can be a potential answer, a solution, feedback, comment, and/or any suitable reply to the problem. Input elements are preferably provided to appropriately collect the problem response such as a text input, media input, or any suitable type of input. In one variation, the problem response interface 130 can enable multiple responses to a single problem request. In another variation, a participant can be limited to a single response.

In one variation, the timing of a supplied response may be used in limiting the duration to which a response can be provided and/or in measuring or otherwise scoring a response. For example, a timer may be displayed to indicate the amount of time for the whole batch process to be achieved, and separately a timer for each individual pair within the batch. Other response content restrictions such as character or word limit can similarly be enforced through the problem response interface 130. More complex natural language restrictions such as sentiment analysis, topic analysis, and/or other forms of content patterns could similarly be applied through the problem response interface 130 (either directly in the interface or as a server-side validation process). In one implementation, the problem response interface 130 can include response autosuggesting where other supplied responses or generated responses can be displayed as a response is entered. Selection of an autosuggested response may be used in facilitating grammatical 'slot and frame' protocols or architecture to impose drop down frameworks and limitations for decisions involving complex reasoning but limited choices or the consolidation of responses and/or reduction of unique responses. In this variation, the machine learning model used in consolidation may be used in identifying similar submitted problem responses and presenting them as autocomplete options. Selection of one of those autocomplete options may be used as reinforcement input to the machine learning model as to the similarity of what was typed in the input form and the selected option. Similarly, if a problem response is submitted without selection of an autocomplete option, then that may be reinforcement input to the machine learning model as to the difference between the submitted problem response and the presented autocomplete options.

The problem response interface 130 preferably collects responses from one or more participants and submits them to the distributed intelligence platform 110. The distributed intelligence platform 110 preferably includes a response processor 112 and judgment management system 114 used in processing and operating on the collected responses.

The response processor 112 functions to consolidate the responses to a set of base responses. The consolidation process can reduce substantially redundant or conceptually similar responses, which may simplify the number of responses that need analysis. The response processor 112 preferably applies natural language processing to group responses. Responses grouped together are described as base responses.

Machine learning data from previous challenge processes can be stored for reference during any new challenge process, to provide the first part of the similarity scoring process using a matching algorithm as part of the unsupervised natural language assessment initiated when the ideation process is ended. Machine learning data is classified against the original semantic proposition for natural language purposes by using individual response IDs (identifiers assigned to the centroid under each Cluster ID. Machine Learning data bases can be fixed but can provide the first part of two similarity calculations made by the system comparing the relevance of any Machine Learning Data base challenge ID and the Current challenge ID. Similarity of meaning is always considered as a function relative to the originating semantic proposition under consideration, and so the relevance of the Machine learning data base material is weighted downwards using a similarity comparison of the Machine learning data base's originating semantic proposition and the semantic proposition under the Current challenge ID. Current challenge IDs are then added to the machine learning resources on a continual basis, once determined under optimal stopping to be hard clustered. This legacy data can be exported as a product of the process, to hard storage and transacted commercially to third parties, as Similarity Corpora, to be used as references, for matching algorithms, digital trace analysis or digital finger printing. These new, real-time, discrete Similarity Corpora are expected to largely replace and augment traditional, historic text corpora, and therefore revolutionize access to very large and currently under utilized, inaccessible data bases of unstructured data, which have remained under utilized for many years.

The response processor 112 preferably includes a machine learning model that facilitates consolidation. Initially as a function of the information received from the machine learning data bases and the unsupervised computational linguistics model selected, and optimized by the language detection micro service, responses will be initially clustered using definable probability thresholds. With any Cluster the system then makes a 'moments' calculation between each of the members of the cluster to find using least squares the Centroid, ie the response with the lowest, least squares' in that momentary discrete set.

The response processor 112 can additionally assign a base response representation (e.g., a description that can be displayed within the response judgment interface 140 in analysis of the various responses). In one variation, a base response representation can be one of the associated response options. In one implementation, the centroid of each grouping of associated responses is used. In another variation, a base response representation can be a representative version of multiple response options. In one implementation, a generative adversarial neural network (GANN) and/or a predictive language model (e.g., GPT-2, GPT-3, or other forms of generative pre-trained transformer language prediction models, autoregressive language models, deep learning models and the like) may be used in generating a fully synthesized base response for a group of associated response inputs. This variation may use each response input of a group as an input into the GANN, and then the output of the GANN may be used as the base group response. This base response can change as the grouping and associations of response inputs is modified in response to the data input collected during the judgement stage. In one variation, hierarchical grouping may be performed so that there may be different levels of base responses.

In one variation, the distributed intelligence platform 110 can additionally include a base response management interface wherein base responses and their associated problem responses can be managed by an administrator. An administrator could edit base response representations. An administrator may also change the grouping of responses.

The judgment management system 114 functions to distribute base responses to participant instances of the response judgment interface 140 for comparison. The judgment management system 114 determines distribution or allocation of response comparisons so as to collect a representative sample of comparisons. In one variation, the comparisons can be randomly generated and assigned to participants. Alternatively, different comparisons may be selectively distributed according to participant properties. For example, pairwise comparisons may be distributed so as to collect judgment responses from a sample of participants with balanced properties (e.g., a balance of psychometric characteristics). Various pairwise comparisons are preferably distributed across participants that share a classification so that a representative view of that type of participant can be obtained (as opposed to characterizing the view of each individual participant. The distribution of responses for comparisons can additionally be dynamically adjusted based on collected judgments. For example, in evaluating many base responses, an initial round of comparisons may indicate a first subset of base responses with higher preference and a second subset of base responses with low preference. The first subset of preferences could then be distributed in more comparisons to increase statistical significance of those preferences, creating the opportunity to add the scientific methodology of 'R' factor analysis to 'Q' factor analysis as a better way to understand natural language at the level of diagnostic and predictive causal reasoning. Additionally or alternatively, child base responses of the first subset of base responses could also then be explored to identify more specific response preferences, to allow Users to quickly move from strategic enquiries to implementation planning.

Figure 4:
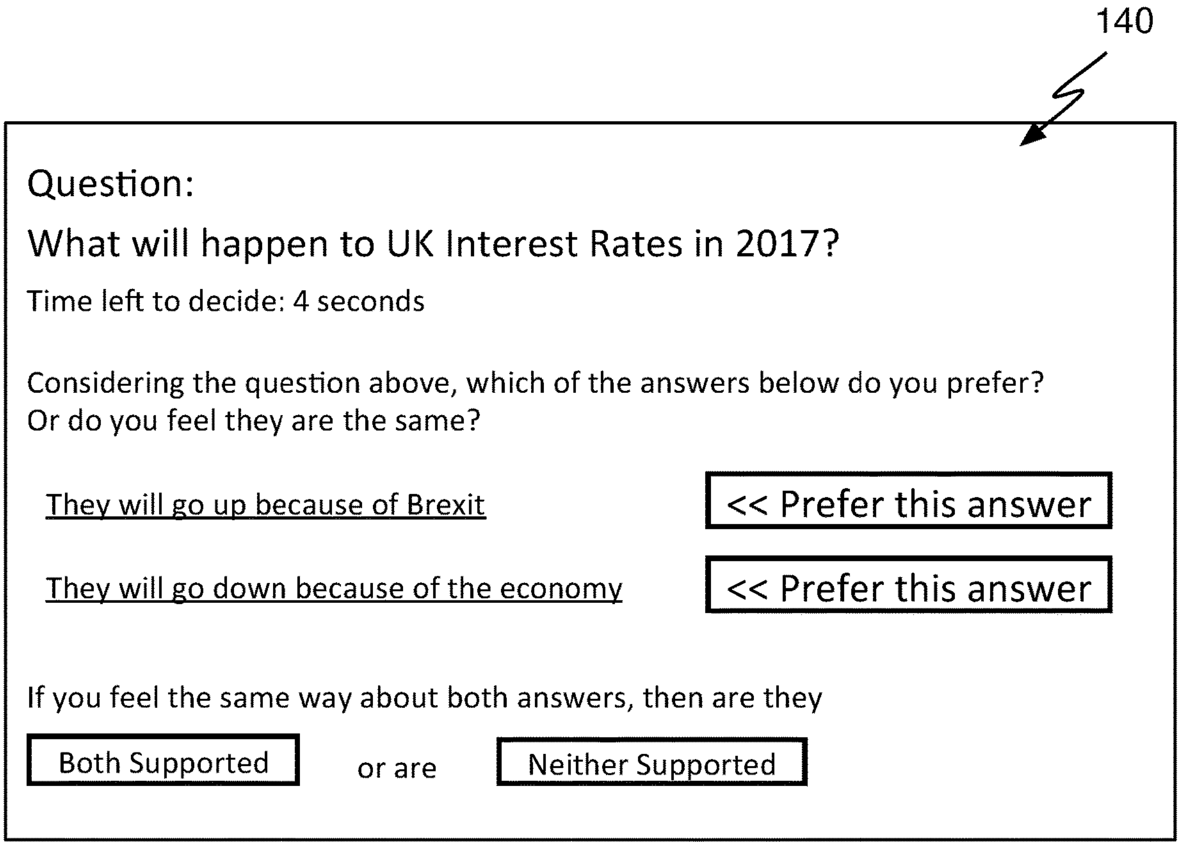
FIG. 4 is a schematic representation of an exemplary response judgment interface.

As shown in FIG. 4, the response judgment interface 140 functions to facilitate collection of comparisons between multiple response options (i.e., comparative response input or "response judgement"). The response judgment interface preferably presents response options and solicits the participant to indicate their preference for the response. The intelligence platform 110 can dynamically communicate a comparison of two or more base responses to an instance of a response judgment interface 140, from which response judgment input is collected. This can occur multiple times for a given client device (e.g., for one participant) and preferably occurs across multiple different client devices (e.g., for many participants) so as to collect sufficient response judgement inputs to condition the data for output. Comparative response input can be used to reinforce similarity of the compared base responses or difference of the compared base responses. Collected comparative response inputs are collected and used as input into the machine learning model(s) used in generating and outputting the consolidated base responses. Subsequent communications (used for different base response comparisons) with the response judgment interface 140 may be based on previously collected input. Preferably, responses are presented for pairwise comparison. Alternatively, a base response may be presented individually or as a group of three or more base response options. A participant can preferably select one or the other as a preferred response to the problem, select both as equally preferred options, select neither, or make any suitable response. The response judgment interface 140 can additionally collect other information such as participant comments, base response ratings, or other suitable forms of user input. The response judgments are preferably collected and then processed at the distributed intelligence platform 110.

Figure 5A:
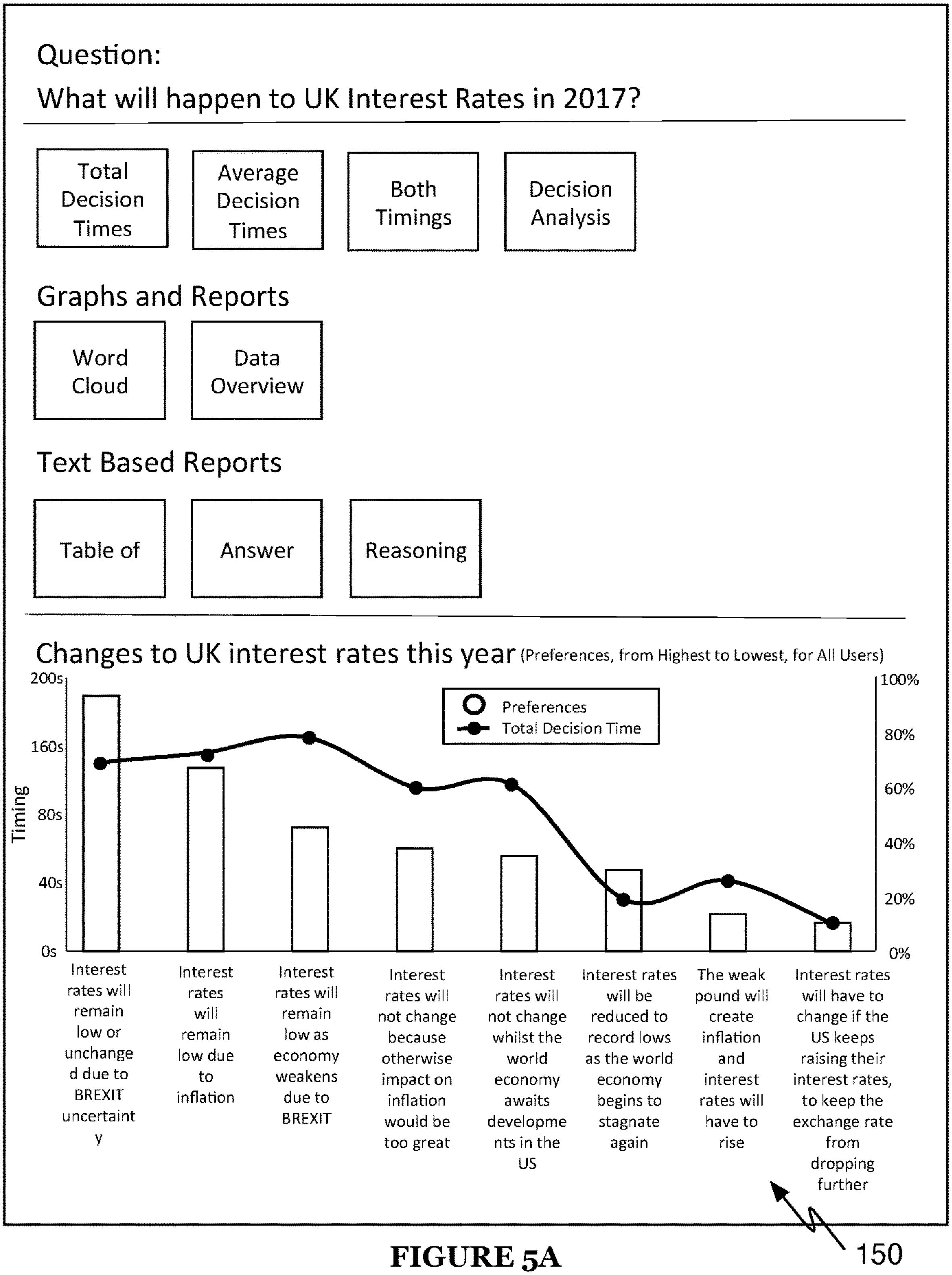
FIGS. 5A and 5B are a schematic representations of exemplary reporting interfaces.
Figure 5B:
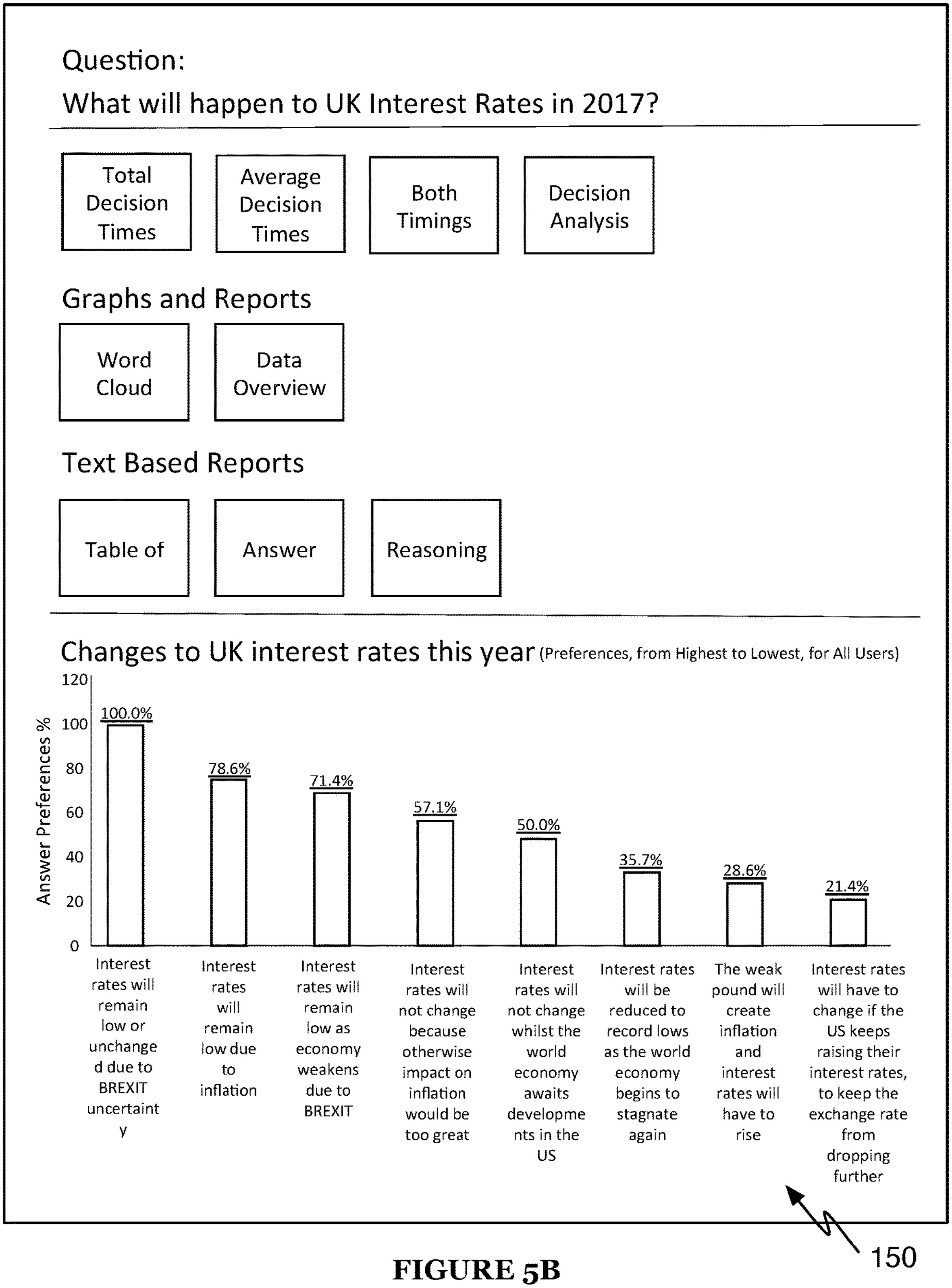

The reporting interface 150 functions to apply the results of the distributed intelligence process. The reporting interface 150 preferably provides a graphical report or multiple graphical reports as shown in FIGS. 5A and 5B. The report can indicate response rankings or preference levels. Response judgments could additionally be analyzed and explored according to various properties, the system provides default Tables of Binary Defeat Relationships, aggregating the 'support' and 'attack' scoring for each response at the binary level, a graphical representation of the oscillation of the aggregated support levels which the system is monitoring itself for optimal stopping of the process, in relation to pre-set oscillation values, and the frequency of re-introduced false positives, by which the GANN is used to validate borderline calculations from the initial unsupervised natural language of idea similarity.

The system could alternatively apply the results of the distributed intelligence process in other ways. In one application, the system can be used as test answer scoring system. The distributed intelligence process can be used by educators in evaluating student responses for example. The system can include a system for automatically awarding of points to a responses based on collected judgment of the response (or base response) and assigning points to user test results or providing a Factor Analysis response matrix for comparison against a Standard. The system could additionally include a mechanism for identifying responses with low scoring confidence (e.g., responses that do not satisfy some condition for automatic scoring) and distributing an evaluation request to an evaluator for manual point assignment to be used with the Participant and in the machine-learning process. The evaluation request can be accompanied by a response analysis to facilitate easier evaluation. For example, similar responses and assigned points may be supplied with the evaluation request.

3. Method

Figure 6:
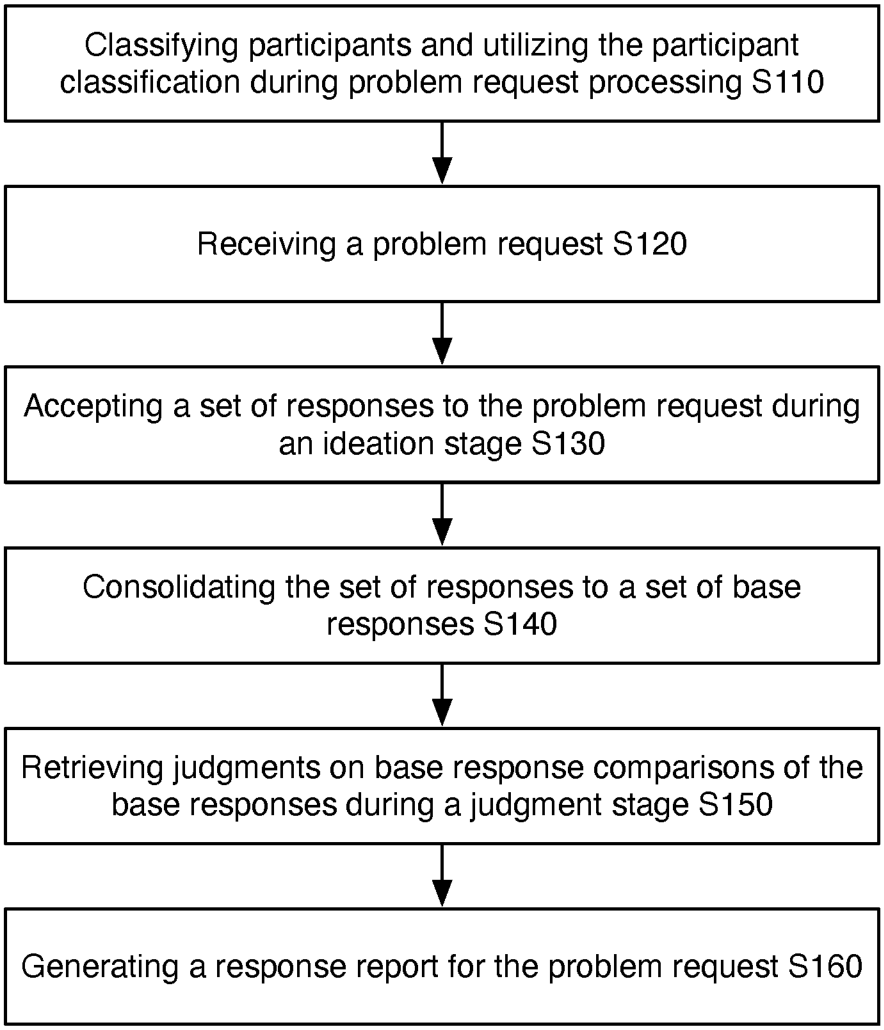
FIG. 6 is a flowchart representation of a method of a preferred embodiment.

As shown in FIG. 6, a method for automated decision making of a preferred embodiment can include receiving a problem request S120, collecting a set of response inputs to the problem request during an ideation stage S130, consolidating the set of responses to a set of base responses S140, retrieving judgments on base response comparisons of the base responses during a judgment stage S150, and generating a response report for the problem request S160. The method functions to promote an efficient and inclusive approach to synthesizing a set of base response from machine learning models and from limited collected input from a set of participating client devices. The method can utilize temporal constraints, natural language based consolidation of ideas using machine learning and computer implemented data processing, and/or automated participant classification based consolidation to expedite the process while maintaining participant engagement.

The temporal component of the method may be used to expedite the collection of responses and/or judgments and in evaluating the responses and/or judgments. Time metrics may be used in defining the initial solicitation of ideas and the individual judgment of each pair of unique ideas. In one variation, time windows can be set limiting the duration of one or more stage and when those windows occur. In another variation, responses can be timed or restricted to be completed by a participant within a time limit. For example responses may be limited to being answered within a certain time period, and/or judgments of base response comparisons may be forced to be made within a particular time window.

The natural language based consolidation of ideas may use a similarity engine to group solicited responses (e.g., ideas submitted by participants) so that the full set of responses may be more efficiently evaluated. Response consolidation can reduce or simplify the number of judged comparisons. Response consolidation can additionally be dynamically adjusted based on participation and results. For example, a large body of hundreds of results may initially be consolidated into ten ideas. Upon identifying a strong trend for preference for a limited number of the ideas (e.g., one to three of the base ideas), then judgment can be expanded to more detailed sub-base ideas of the limited number of ideas.

The participant classification based consolidation can use participant archetypes and classifications to balance the represented viewpoint of the participants. Responses and/or judgments can be selectively solicited from participants. In one variation, the compared base responses presented to a participant are selected and matched together to get a representative perspective of that participant based on their classification. In this way, the method can leverage the diversity of a crowd in evaluating and ranking answers objectively. Participant classification can be used for personality/psychometric classifications, organization classification, demographic classifications, and/or any suitable type of classifications.

Figure 7:
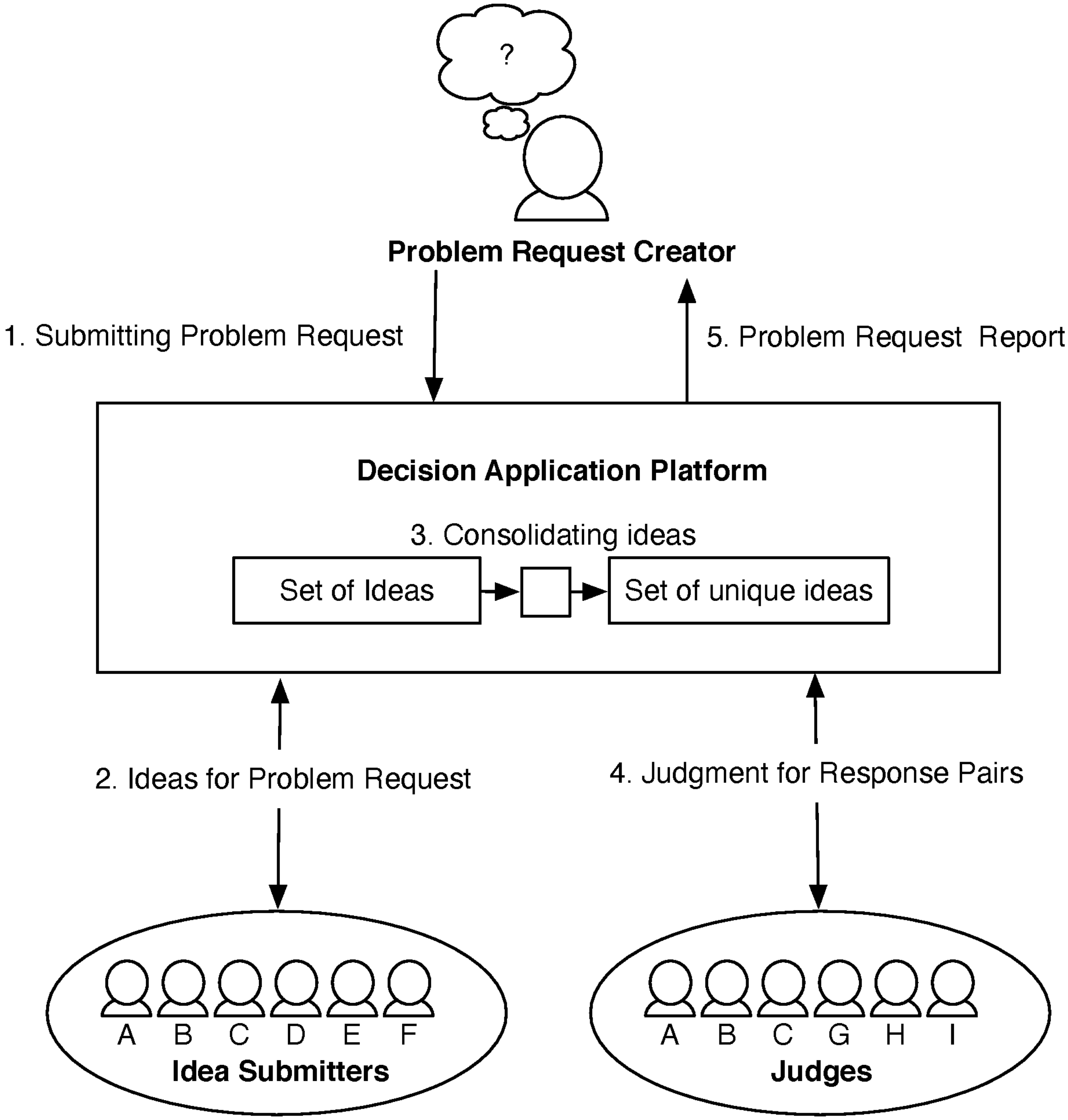
FIG. 7 is a schematic representation of an implementation of a method of a preferred embodiment.

In a general implementation shown in FIG. 7, the method can involve a user submitting a question or challenge as a problem request. Participants provide their ideas as responses within the time restrictions that are configured for the problem request. The ideas are compared and automatically reduced to a base set of ideas where redundant or conceptually similar ideas are substantially consolidated to just one idea. The base set of ideas can then be used in presenting various pair-wise comparisons to participants (e.g., the same participants or different participants) and receiving the preference of the participant and any indication of similarity not necessary identified by the unsupervised element of the natural language process. Finally, a report can be generated for the problem request that may rank the ideas based on collected data from the process such as participant comparison preference, response times, participant weighting, and/or other suitable factors. Such a process can be streamlined and simultaneously inclusive.

The method is preferably implemented through a computer application system such as the one described above. The method can include providing the various view interfaces to facilitate implementation of the method. Additionally, user interactions may involve a request and response communication flow that is managed by a distributed intelligence platform. The computer application system can include a web-based application interface, a native application interface, and/or any suitable type of interaction interface. For example, in some cases, an implementation of the method may utilize a messaging service in soliciting and receiving questions, responses and/or judgments. The computer application system is preferably implemented in a cloud-based computing solution. The computer application system may alternatively be an on-premise application such as if a company wants to run a private instance of the application within their intranet. The computer application system preferably includes a user account system such that a variety of users can participate through their account. The computer application system in addition to facilitating implementation of the method can enforce policy on permissions of problem requests and/or user accounts. Problem requests and the participating user accounts may be restricted so that only particular user accounts can participate. For example, a problem request may be restricted to a defined list of participants or to participants associated with a particular business. Alternatively, problem requests may be made public so that any user account could participate. Additionally, permissions can be customized for who can submit problem requests, responses, and/or judgments. In one exemplary implementation of a user interface, a user may be presented with the option to create a problem request, provide their input in a response to a problem request, judge the comparison of responses for a problem request, and/or view results of a problem request.

In one variation, the method can additionally include classifying participants and utilizing the participant classification during problem request processing S110. Preferably participants are classified according to a psychometric classification. A psychometric classification is preferably a characterization of behavioral and/or personal traits of a participant. An example of a psychometric classification can include a Myers Briggs type classification, but any suitable type of psychometric classification may alternatively be used. Alternatively participants may be classified along alternative dimensions such as political stances, field expertise, skills, demographics, corporate or organization position (e.g., manager or employee), and/or other suitable classifications. Participants can be added to Groups of Participants with similar decision-making profiles such that they function as one group to make the assessment of a number of pair-wise choices as a team, where one person would not be able to cope with the workload in the time allowed. The system monitors the individual Participant choices on a nonparametric basis to confirm the authentic inclusion of its members as changes in individuals which may occur over time, and across decision filed types. The Machine Learning data bases therefore include authenticated psychometrically similar thinking groups, similar to, but much better defined that demographic groups, which information can also be offered on a commercial transactional basis to third parties as potential panel members.

Figure 8:
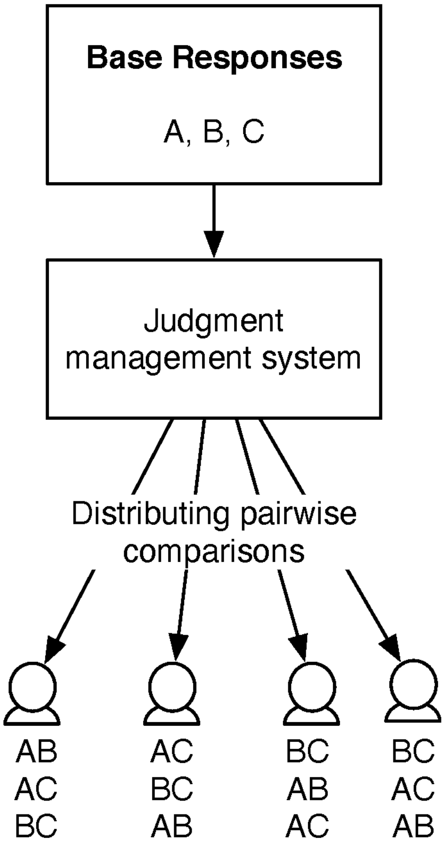
FIG. 8 is a schematic representation of each combination of a base response comparisons being distributed to each participant.
Figure 9:
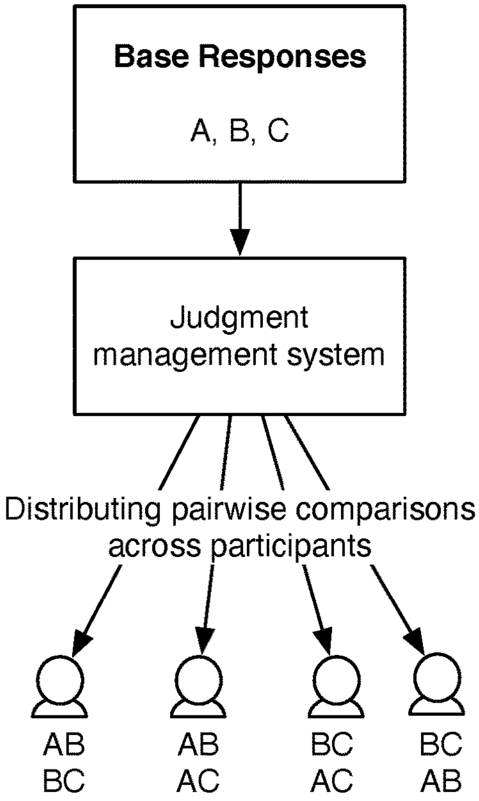
FIG. 9 is a schematic representation of base response comparisons distributed across participants.
Figure 10:
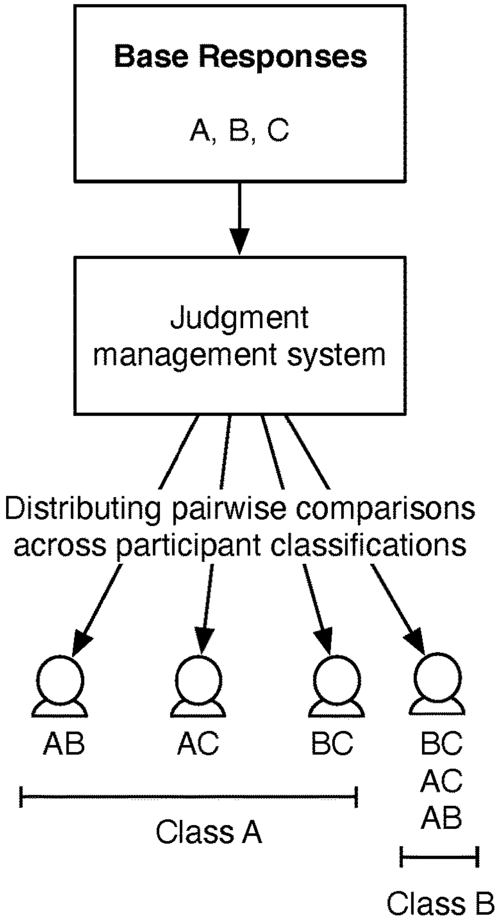
FIG. 10 is a schematic representation of base response comparisons distributed across participants of corresponding participant classifications.

Participant classifications can function to partition participants and generalize participants within a group. This may be used in simplifying the complexity of the distributed intelligence process. In a preferred scenario, every participant can indicate their preference on every combination of base response comparisons as shown in FIG. 8. However, participant classifications can be used to reduce the number of comparisons to be completed by each participant—the full set of judgments desired from each participant can be distributed across participants as shown in FIG. 9. More specifically, those base response comparisons are distributed across participants of corresponding participant classifications as shown in FIG. 10. Although the ideal situation would be for the complete set of pair-wise ordered combinations to be adjudicated, the system overcomes the intractability of this situation by using the groups as shown in FIG. 9. And FIG. 10, but all the time using a system of pure randomization, without segmentation unless selected by any User.

Participant classification can additionally be used in generating a report in block S160.

In one variation, the manner of partitioning or classifying participants can be configurable aspect of a problem request. In one variation, the participant classification approach may be set during the configuration of a problem request.

Figure 11:
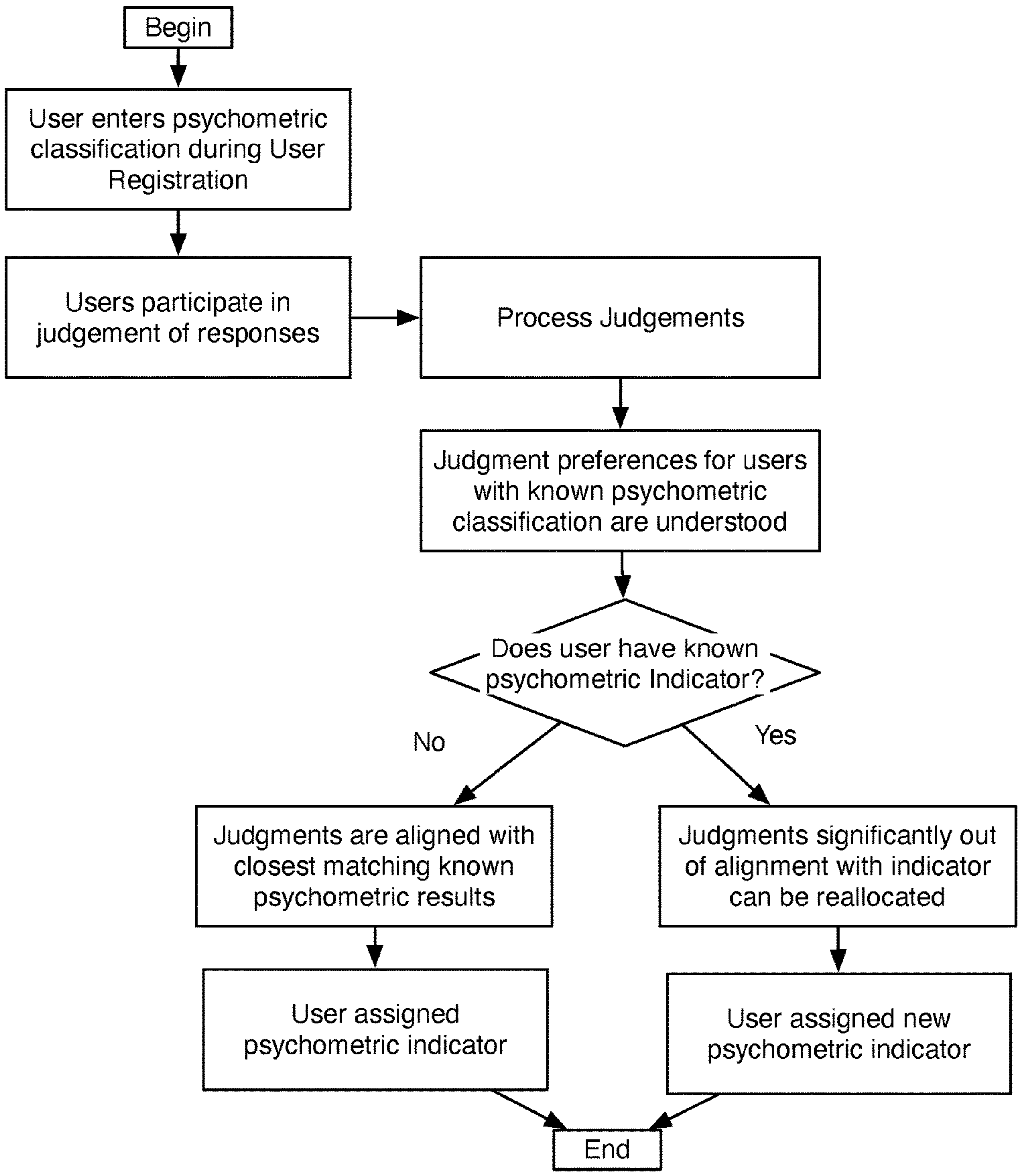
FIG. 11 is a flowchart representation of assigning a participant classification.

A participant classification may be manually assigned to a user, wherein block S110 may include receiving a participant classification. For example, if a user is aware of his or her Meyer Brigg's classification, the user could add that classification to a user profile. Additionally or alternatively, a participant classification may be generated or augmented through participant analysis. For example, the ideas and/or judgments of a participant may be compared to other participants, and the classification of a participant may be updated to group the participant with participants with similar behavior. Participant analysis and classification could additionally or alternatively be through participant usage of another platform such as user characteristics extracted from a social network profile or posts. As shown in FIG. 11, user-provided classification may be used in combination with automatic classification. If no classification is provided, a user may be automatically classified using existing data, wherein the automatic classification may be updated as more data is collected. In some embodiments the method may treat each user the same but other embodiments may utilize the participant classification in various ways during the method. In this way, the system uses machine learning to store data bases of classified Participants, which are updated from time to time, to both improve the effectiveness of the system, and to provide Groups of 'like-minded' individuals for third-party panel adoption on a commercial basis.

Preferably, utilizing the participant classifications can include retrieving participant input according to participant classification. Retrieving participant input based on participant classification can include requesting problem responses from a set of targeted participants, wherein the targeted participants are selected that satisfy a participant classification condition. A participant classification condition used in requesting/soliciting problem responses can be used to target participants across a diverse set of classifications. Alternatively, problem responses could be requested from a narrow focuses group of participants.

Retrieving participant input based on participant classification can additionally include assigning a set of base response comparisons to participants and selectively distributing the base response comparisons in connection to Block S150. This selective distribution can function to distribute judgments across the various participant classifications. The base response comparisons are preferably assigned or allocated to participants, wherein the full set of combinatorial combinations of base response comparisons is distributed across a subset of participants with a common participant classification to ensure the requirements of a fair statistical test. As discussed above, this can function to alleviate any requirements or preference for a single participant providing judgments of each possible combination. Dynamic assignment and distribution could similarly be used in targeting judgments by particular participants if their judgment is more highly valued.

The method can additionally dynamically retrieve participant input to fulfill various levels of participation from users of different classifications. The participant classifications can additionally be used in other aspects the method (e.g., Blocks S120, S130, S140, and S150).

Block S120, which includes receiving a problem request, functions to initiate problem request processing. The problem request is preferably submitted by a participant and received through a problem request interface such as the one described above. Alternatively, problem requests may be automatically generated.

A problem request preferably includes receiving a primary objective in the form of a question, challenge, problem statement, or other form of problem to an audience. The primary objective can be presented in a textual format, media format, or a multi-media format. In some cases, the primary objective may be concisely presented (e.g., less than 500 characters), and in other cases, the primary objective may include a detailed explanation of the problem with supplementary media attachments for reference.

The primary objective may additionally be processed and/or validated. One processing task may validate that the problem request satisfies particular requirements such as length, language, sentiment (e.g., identify negative, aggressive, or problematic content), and/or other conditions. Another processing task may be to identify similar or related problem request such that they can use the existing or active problem request instead.

Receiving a problem request can additionally include setting properties of the problem request. The properties of the problem request can include ideation stage properties and judgment stage properties. The problem request can additionally or alternatively use other suitable properties used in configuring an instance of problem request processing. An example might be to elicit probabilities in relation to a causal effect of prediction, where the decision is to be decided on a rational comparative judgement basis, rather than an aggregation. The system Clusters are in these circumstances stored as Bayesian Idioms and may be provided as the building blocks for risk management tools and transacted to third parties as 'plug ins' for Bayesian Networks, these again created in minutes rather than weeks or months.

The ideation properties can include temporal properties such as a process start time and a process end time that define when the problem request is open and available for solicitation of responses. In one variation, different segments of participants may be given different time windows for submitting responses. The ideation properties can additionally include participant properties that set which users can submit responses. The ideation properties may additionally include response volume properties. Response volume properties can set conditions based on the number of responses. Response count could be in raw received responses but could alternatively be measured by number of consolidated base responses. For example, a minimum threshold on the number of unique base responses could be used to determine when the ideation stage closes. Volume properties may be used in combination with or as an alternative to the temporal properties. For example, a problem request could be open for one week or until a set number of responses are received. Another ideation property could be individual response time limits. In one variation, ideas submitted as responses may be limited to being submitted within a particular time window, which functions to promote more spontaneous and intuitively submitted responses.

The judgment stage properties can include temporal properties that similarly define when the judgment stage is open and closed. A judgment temporal property may additionally define the amount of time a judgment may be made on a particular pair-wise comparison. The judgment stage properties can additionally include audience properties that can be used to define how retrieval of judgments is distributed across an audience. In one preferred variation, judgments may be distributed across an audience according to psychometric classifications of the participants. The judgment stage properties can additionally include volume properties. In one variation a minimum number of judgments can be set, and the judgment stage can be kept open until at least the minimum number of judgments are achieved.

A problem request can additionally be configured with a reward setting. In some variations, monetary or virtual rewards may be granted for particular actions relating to a problem request. Setting of rewards may enable an entity posing the problem request to incentivize participation, or linking them to an on-going reward structure for the IP created by their contribution to any thinking exercise and integrated to a block chain methodology or similar for that purpose. In one variation, report output of the method may be integrated with blockchain or other distributed ledger computing systems. Time involved, quality of contribution (possibly measured through the preference judgement and response consolidation), contribution through assessment and judgments provided, can be converted into challenge participant measure that. The method can enable systematic measurement and evaluation, with automated interfaces with such blockchain or distributed ledger systems such as through non-fungible tokens.

The method preferably includes publishing the problem request through the computing platform, which functions to distribute the problem request to a set of participants where the participants are digital accounts with permissions to submit input through one or more client devices. In one variation, publishing can involve making the problem request publicly available or accessible to permitted participants. Publishing can additionally include transmitting problem requests to a set of targeted participants. In this way, particular participants can be actively solicited to participate. Transmitting a problem request can include sending an SMS/MMS, a push notification, an email, a phone call, and/or any suitable type of communication.

Block S130, which includes collecting a set of response inputs to the problem request during an ideation stage, functions to obtain a set of ideas, thoughts, opinions, answers, evaluations, and/or other suitable types of responses to the problem request. The method is preferably configured to substantially maintain the entire set of responses. Spam, fraudulent or particularly low quality responses may be automatically filtered but can also be managed by control mechanisms contained on the interface for the reporting of false or inaccurate information. Where a base response is deleted in relation to it being considered false or misleading, the system deletes all of the scoring calculations associated with it, and rebalances the fair test provisions, without losing the information at that instantaneous stage, to protect the process integrity.

Figure 25:
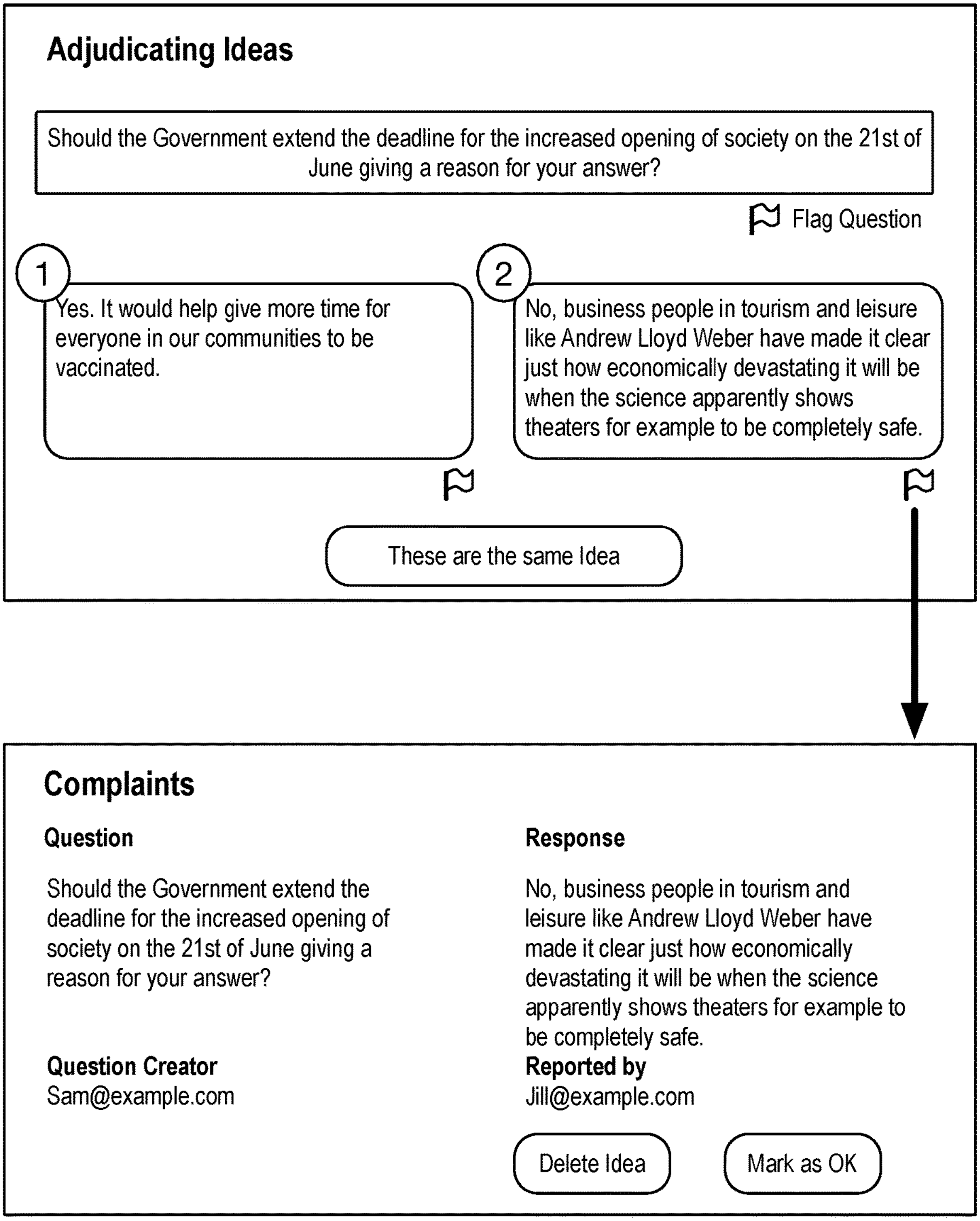
FIG. 25 is exemplary flow diagram of user interfaces when flagging a response.

As shown in FIG. 25, a management user interface may be used to automate review and flagging. This can be performed while appropriately managing assessment of the concept. For example, during a judgement stage, a user can flag a question/challenge prompt or a response as being in some way inappropriate. The administrator of the problem challenge (i.e., the challenge administrator) may then choose what happens in real time using a user interface. The challenge administrator can mark the "flagged" challenge prompt or response as "OK" (i.e., acceptable), and then the temporary block on is released. Whilst a response is on hold, imbalances in judgment of a response may have been created which the system will then address to regain equilibrium in the statistical fair test. The challenge administrator can select to delete or otherwise remove a challenge or response. In one variation, this may: a) remove the response if it was a lone base response, or remove use of the response as a Cluster representative and replace it with the new Centroid in that Cluster (consolidated group of response); and/or b) automatically remove every reference or score from judgement, support or attack, which may trigger a larger response by the system to regain equilibrium in the statistical fair test of the set of responses/base responses.

The ideation stage is preferably conditionally maintained according to configuration of the problem request. The ideation stage is preferably open during a time period and for an audience as configured during block S120. In one variation, block S120 can include configuring a response time limit and block S130 can include, for each response, enforcing the response time limit within a problem response interface. This variation can function to encourage participants to more spontaneously provide ideas, the data for each paired response time is recorded and reviewed in relation to (i) a measure in intuitiveness (ii) the possible need to simplify an idea to avoid bias caused by the inadvertent complexity of a response (iii) the determination of engrained subjective responses, indicating prejudice, cultural bias or conflict.

A response is preferably a textual natural language answer, but it may alternatively be any suitable format such as a multimedia response. Herein, the method is primarily described as it would be applied to text-based natural language responses, but suitable machine learning models may alternatively be used for analysis of other media formats. Preferably, a user can voluntarily supply a response through a problem response interface of a client device. For example, the user may see a post soliciting responses to a question on the application website, and the user can open the post to add his or her response. Alternatively, a user may be actively requested to supply a response. For example, once a problem request is made, a set of participants may receive a notification via email, push notification, SMS/MMS, or another suitable communication channel. An organization, team, or business may actively solicit participation from particular users for problems that could benefit from fuller participation. In one variation, the computer application system includes an API such that outside services and applications integrate with the system and supply responses.

Figure 12:
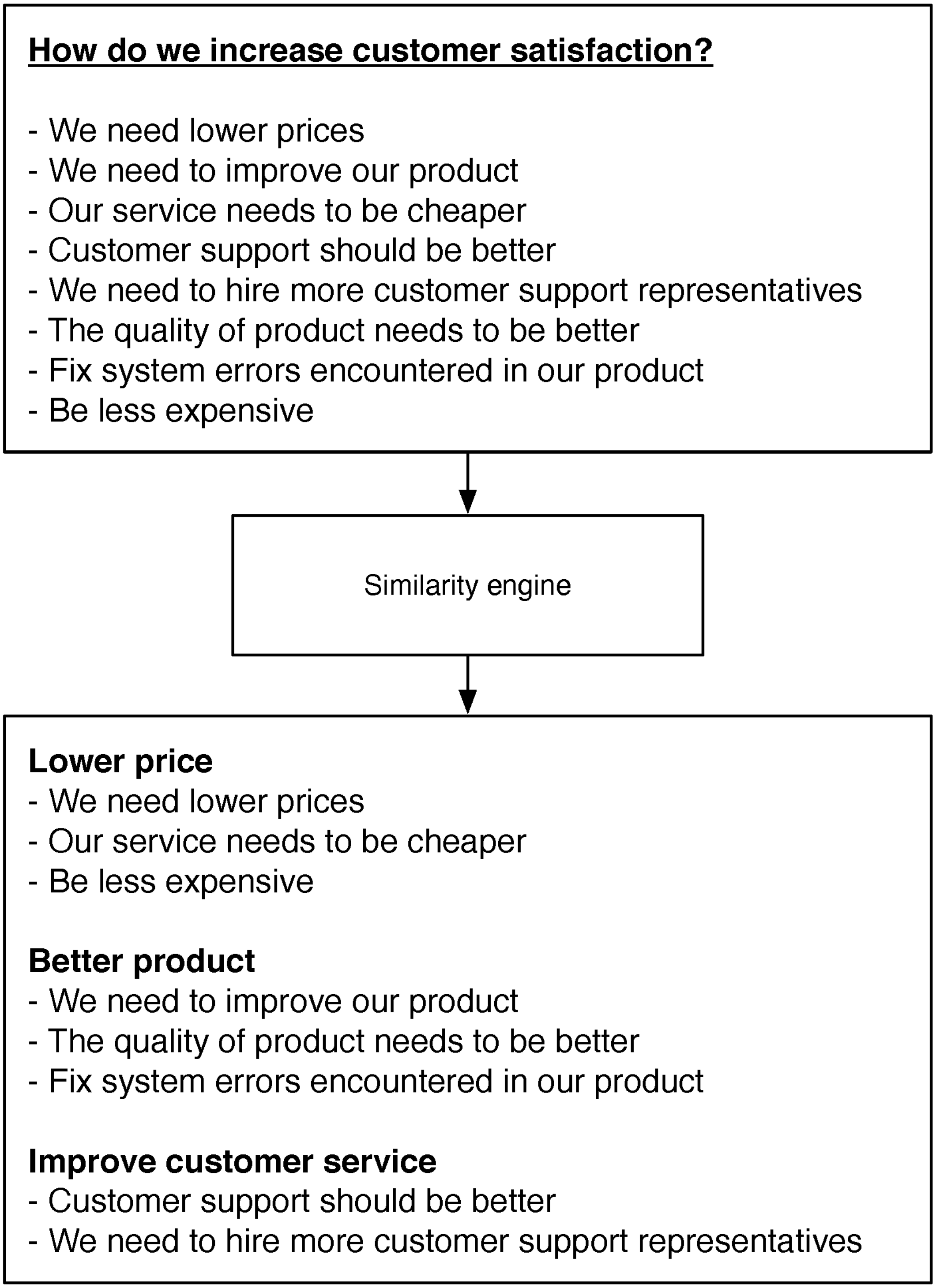
FIG. 12 is a schematic representation of consolidating exemplary responses.

Block S140, which includes consolidating the set of responses to a set of base responses, functions to reduce substantially redundant or similar responses and group them together. Consolidating the set of responses to a set of base responses preferably includes grouping responses of similar concepts and assigning a base response representation as shown in FIG. 12. The base response representation is presented to participants in the base response comparison of Block S150. A similarity engine preferably processes the set of responses. The similarity engine can use natural language processing, machine learning, and/or alternative algorithmic techniques to group similar responses. The full set of responses represent each submission (i.e., valid submission) during the ideation stage, and the set of base responses represent a limited number of submissions that (according to the similarity engine) account for the main or unique concepts represented in the full set of responses. In one variation, consolidating of the set of responses can be configured to promote more or fewer base responses. For example, a user during block S120 may set the problem response processing to use a more aggressive similarity comparison process to arrive at a conclusion faster. Additionally, the method may enable user review of the set of responses and/or the base responses.

In one variation, consolidating the set of responses to a set of base responses can include performing the operations such as: accessing legacy data bases where the questions are sufficiently similar; selecting an appropriate amalgam of computational linguistic methodologies as determined by the language detection micro service; performing generative adversarial neural network monitoring and curating 'support' and 'attack' signals from the human computer interactions, re-distributing marginal ideas from their clustered state to validate false positives from the secondary machine learning data bases and primary computational data base or reference to any of the available, commercially available corpora.

In one variation, block S140 can include updating the set of base responses as directed by a user edit. An administrator of the problem request may edit or adjust the sets of responses and/or base responses. For example, responses grouped together as a single base response may be split into two or more distinct base responses. Similarly, multiple base responses can be combined. Changes to base responses preferably occur before a judgment stage, but could alternatively or additionally be performed during the judgment stage. In one variation, a participant may mark a response as being similar to another response. For example, a response judgment interface can include an option to mark the two base responses as being conceptually similar, which may then be used to augment the grouping of the base responses.

A base response can include one or more associated responses. In one variation, grouping of responses can be hierarchically structured such that a base response can include a child base response. Hierarchical consolidation may be used in dynamically adjusting the consolidation of base responses during a judgment stage.

Figure 14:
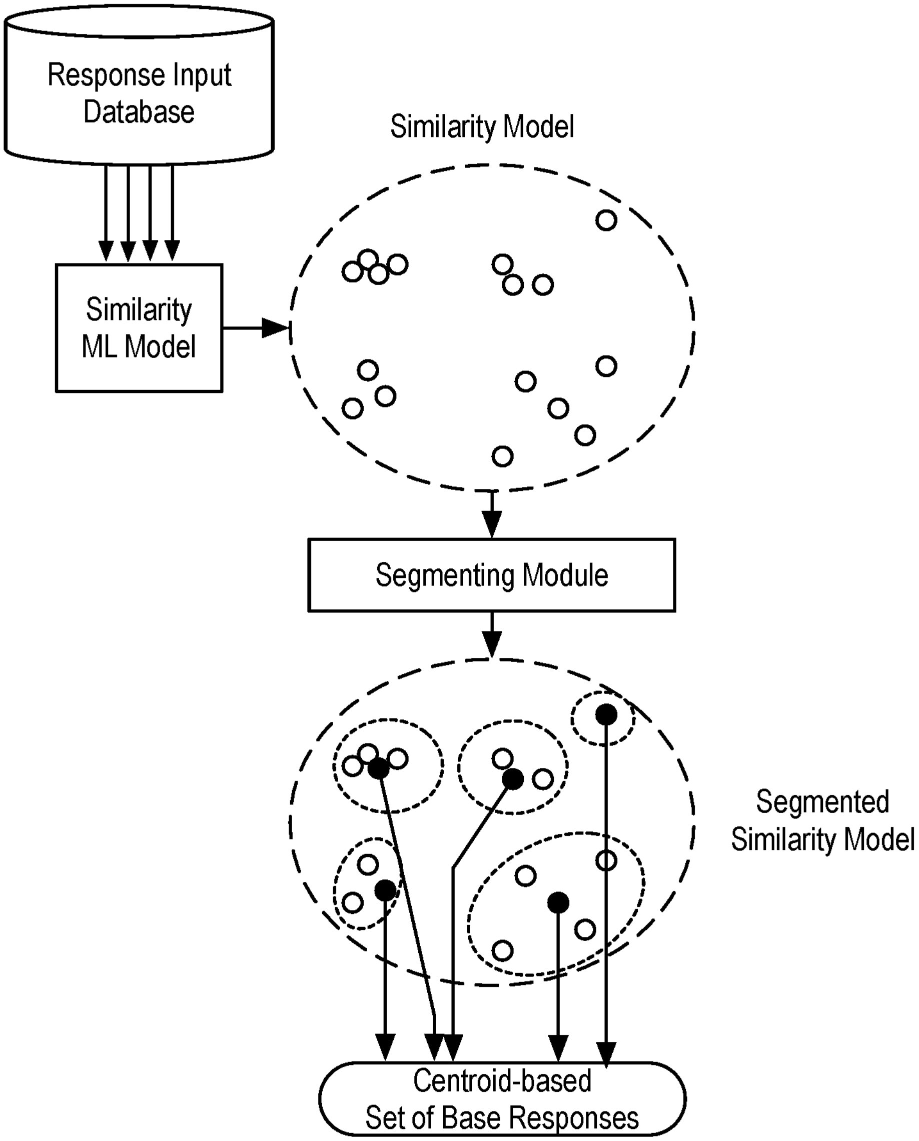
FIG. 14 is a schematic representation of one variation of consolidating response inputs using centroid based selection of base responses.
Figure 18:
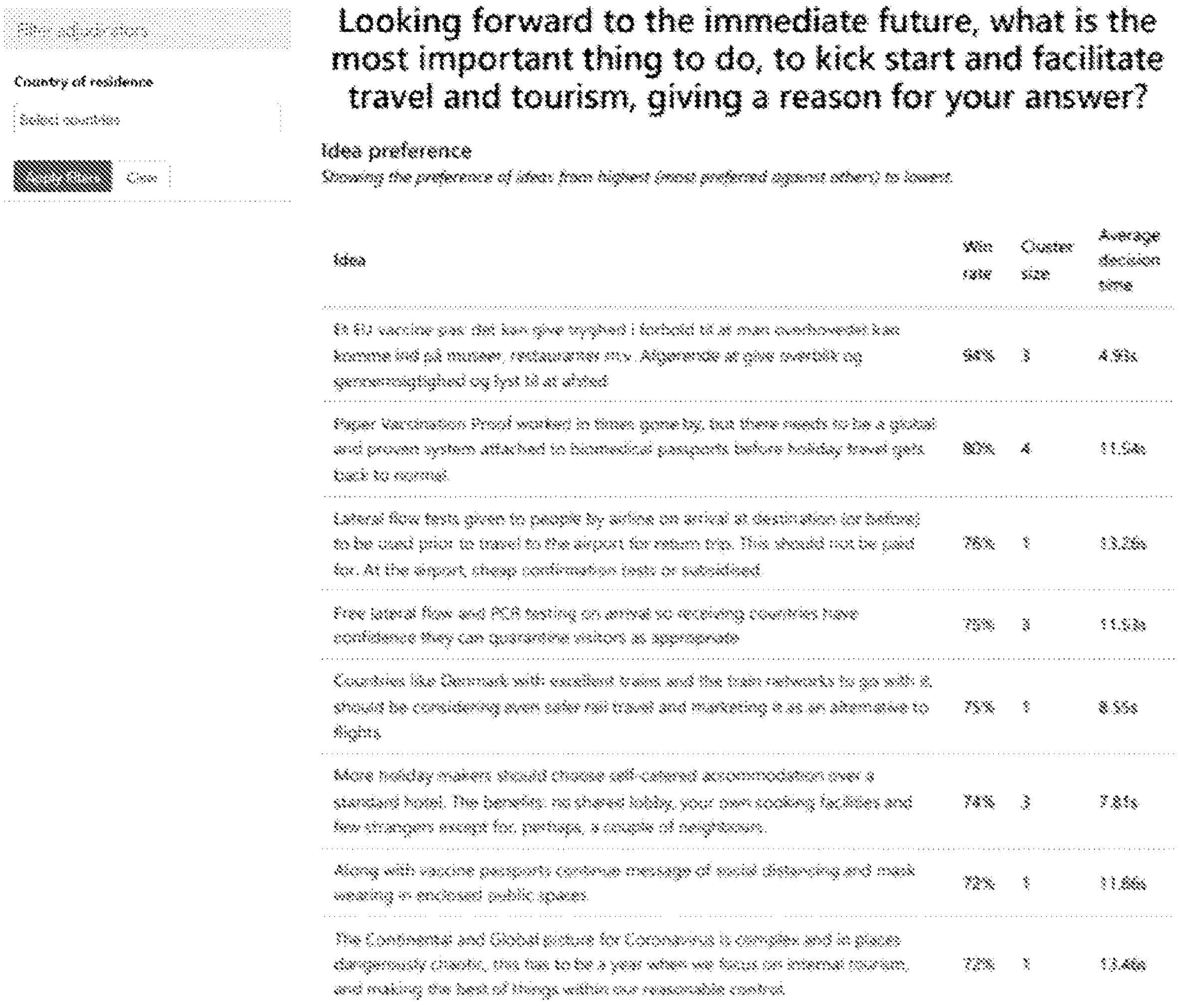
FIG. 18 is a screenshot representation of a result page with filtering options.

A representation of a base response is preferably used when presenting the base response in the judgment stage. The representation can be algorithmically generated, selected from the group of associated responses, manually supplied, and/or provided in any suitable manner In one variation, consolidating the set of responses can include setting the base response for a group of associated response by selecting the centroid response input for a response group as shown in FIG. 14.

Where segmentation is requested, the segment itself is regarded as a discrete partition of the overall process, such that each segment will receive the base responses as if it where the whole. The system will default at the Reporting stage as if there are no segmentations but then instantly report the segment performance when selected by the user. For example, a user may select an option to filter by country as shown in FIG. 18.

In one algorithmically generated variation, a consolidated version of a base response representation can be algorithmically selected from the associated responses based on a natural language scoring of the responses. The selected response can then be used as the representative of the base response. The method may prioritize particular response properties such as brevity, clarity, grammar, and/or other factors. The selected response may additionally be selected based on having the highest similarity score to the other associated responses using a moments calculation of least squares derived from the probabilities for each idea, to each other idea, these being a function of the initial unsupervised computations and the curation of 'support' and 'attack' scores flowing from the GANN as indicating dissimilarity, or additive scores flowing from the participant use of the similar ideas buttons.

Figure 15:
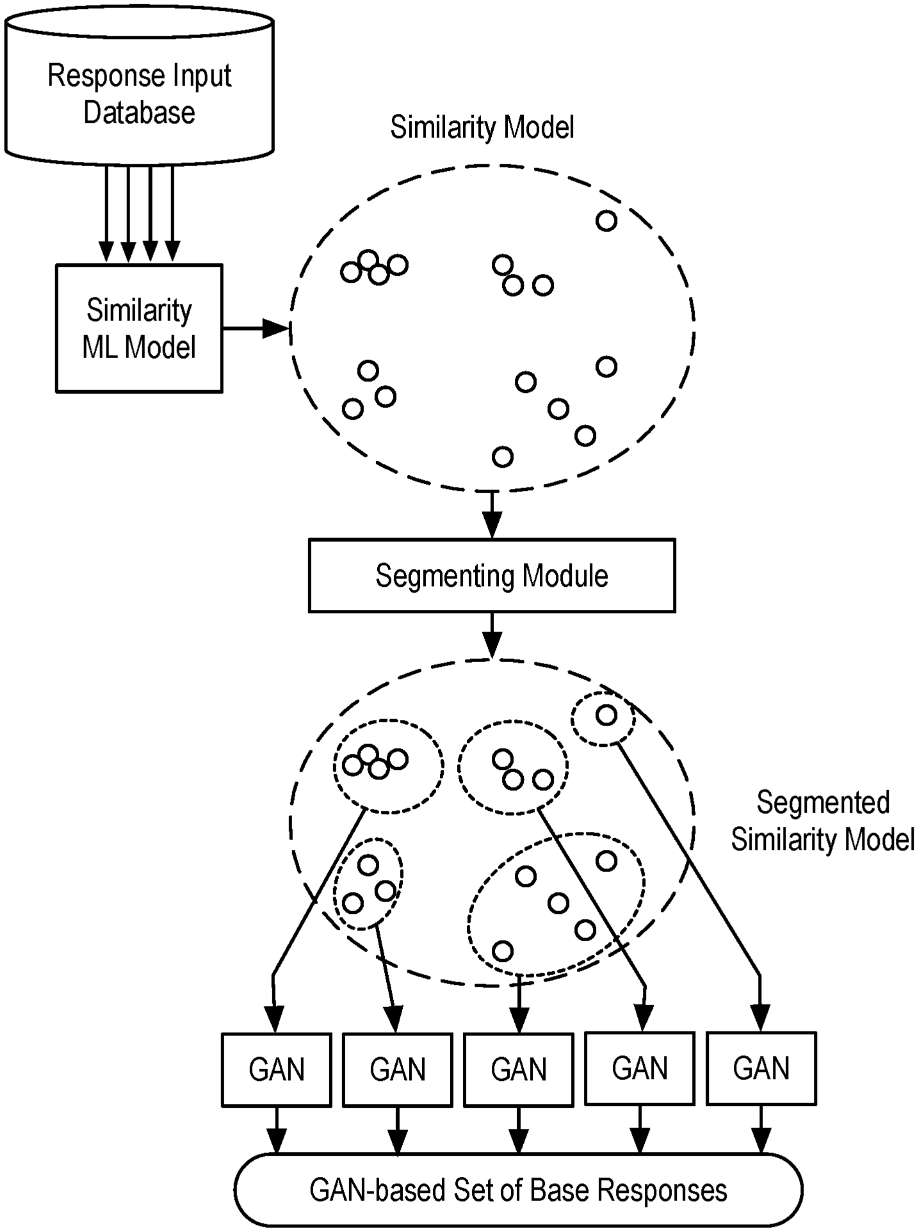
FIG. 15 is a schematic representation of one variation of consolidating response inputs using a predictive language model for generating base responses.

In another algorithmically generated variation, the consolidated version of a base response representation may be automatically generated from at least a subset of the set of similar responses. For example, the base response may be a generated response including content from multiple responses. In one variation, consolidating the set of responses can include setting the base response for a group of associated response by processing, using a predictive language model (e.g., a GANN), a set of associated responses and outputting a synthesized representative base response to be used in representing the group of associated responses during a response judgment challenge. As shown in FIG. 15, a GANN or other suitable type of predictive language model can be used to convert each response group into a representative base response.

In yet another variation, the base response representation may be selected based on outside factors. For example, a response may be selected based on which user has the highest priority, where priority may be based on factors such as participation, expertise, job function, system generated Brier Scores, or account settings.

The base response representation may alternatively be randomly or otherwise selected as the representative response wherein the presented base responses can vary between different instances of a base response comparisons. For example, in the comparison of base response A and base response B, different participants may see different responses representing A and B. When a base response is used in a base response comparison, one response from the associated responses is selected to be the base response representation used in that instance of a comparison such that more responses may be shown during the judgment. The selection may be random, ordered, or use any suitable prioritization.

Block S150, which includes retrieving judgments on base response comparisons of the base responses during a judgment stage, functions to allow one or more participants to state their opinion on how the various responses compare. The base response comparisons are preferably pairwise comparisons. Pairwise comparisons are preferably used because a participant may more easily distinguish their preference when given two options. Alternative implementations may allow more options to be presented for a given judgment. In yet another alternative implementation, a judgment may be made for an individual response. In another variation, the number of base response options can be variable for different comparisons distributed to participants. In one variation of variable options, the number of base response options could be randomly selected. In another variation of variable options, the number of base response options could be incrementally reduced as judgment data is collected and used to identify higher preference base response options, which may function to more quickly eliminate/filter out low preference options or conversely identify higher preference options. Herein, the method is primarily described as providing two response options during an individual judgment, but this is not intended to limit comparisons to only two options.

A judgment is preferably collected user input that characterizes user preference. The judgment is preferably collected through a response judgment interface and then communicated to the distributed intelligence platform.

Accordingly, retrieving judgments can include receiving user preference of one or more base response of the base response comparison (e.g., selection of one, both, or neither). A judgment could additionally include comments, ratings of one or more options, or any other suitable mechanisms for characterizing a judgment. For example, a participant may indicate if they strongly prefer the first option, somewhat prefer with a first option, hold no preference, somewhat prefer the second option, or strongly prefer the second option.

Figure 16:
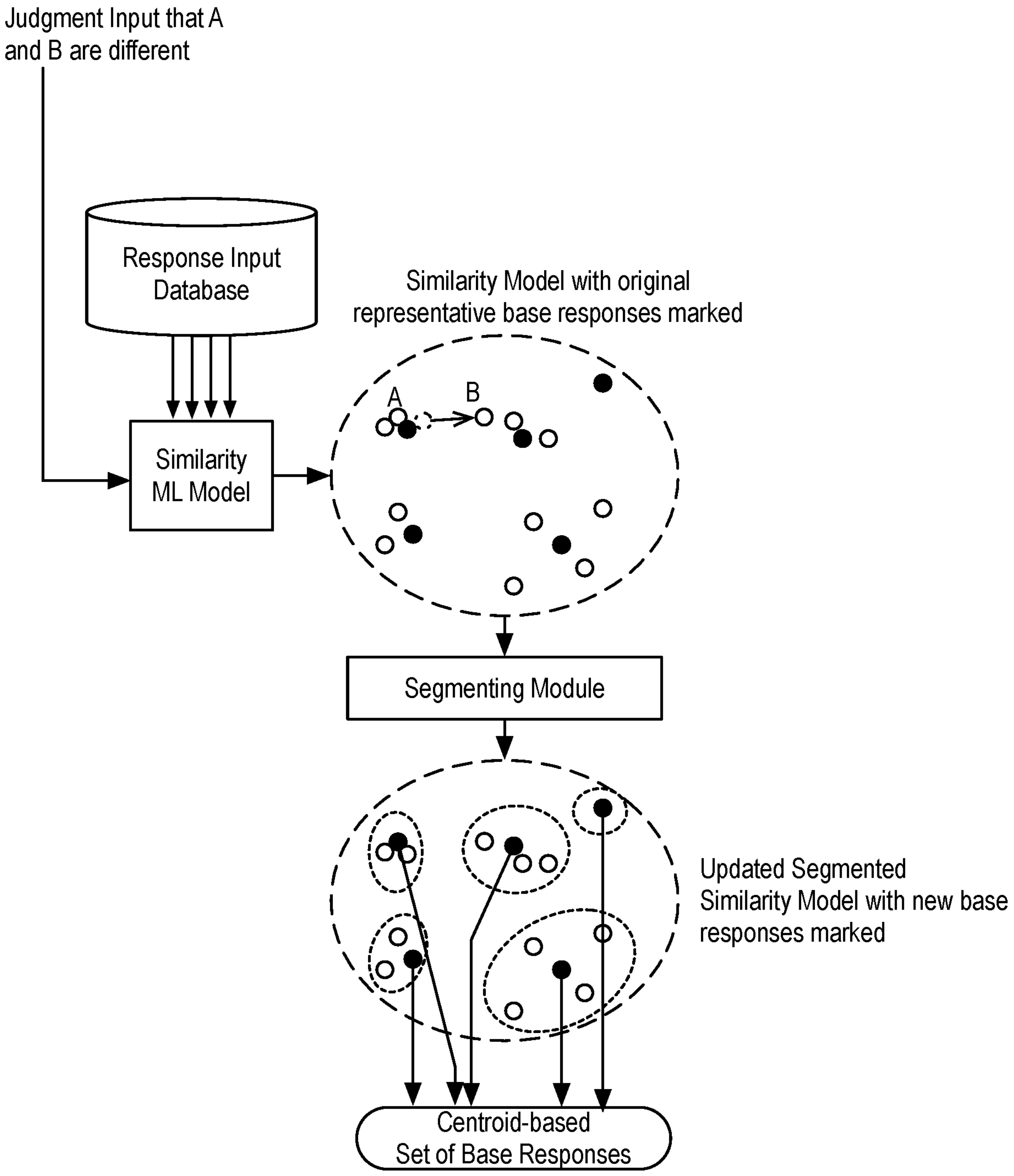
FIG. 16 is a schematic representation of one variation of re-consolidating response inputs based on collected comparative response input.

In one variation, collecting judgement input in the form of response comparison input can be used in augmenting the consolidation of base responses, which then alters subsequent collection of judgment input. In one variation of varying subsequent collection of judgment input, the set of base responses can dynamically be updated with grouping refined based on collected judgement. For example, the similarity modeling of two judged response inputs may change based on a judgment input, and this may lead to a change in the set of base responses as shown in FIG. 16. Additionally or alternatively, in another variation of varying subsequent collection of judgment input, the pairing of base responses for comparison may be dynamically adjusted in response to collected judgment input.

Figure 17:
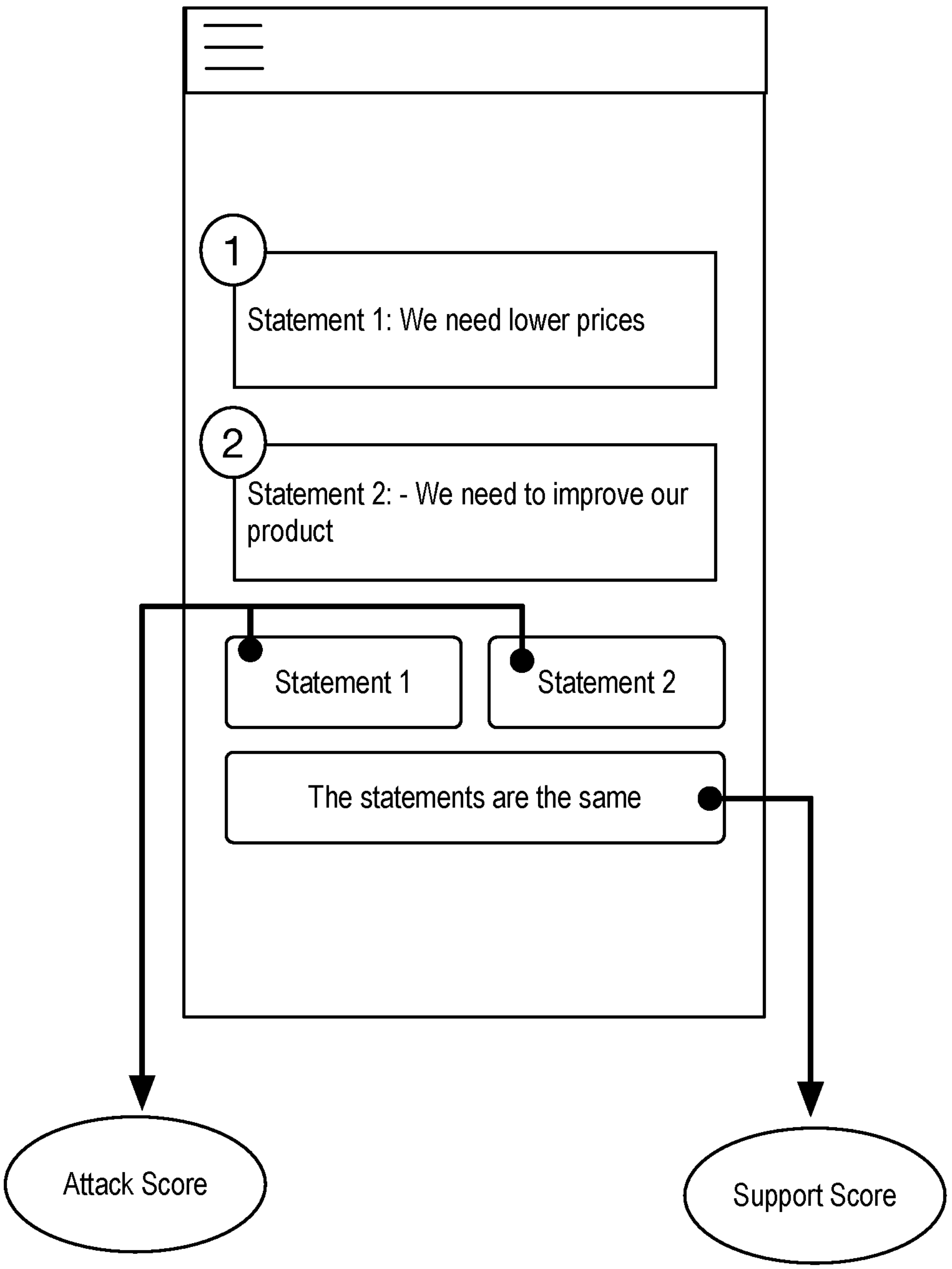
FIG. 17 is a schematic representation of impact of comparative response input options when used to update machine learning models.

As shown in FIG. 17, judgment input from a response judgment interface may be used in different ways in altering consolidation of responses used in subsequent instances of response judgments.

When judgment input indicates preference between two base responses, the neural network can receive an "attack" score, which results in the neural network reducing the likelihood that the two compared base responses are the same. Accordingly, preference for one response score is recorded as well as the "difference" of those two base responses. Alternatively, when judgment input indicates the two base responses are the same or nearly the same, then this input feeds back as a "support" score, reinforcing similarity measurement output from the neural network. In this way, consolidation by machine learning model(s) can dynamically respond to collected judgement input. In one variation, selecting an option equating the two base responses as the same, triggers display of a Likert scale for collecting a measurement of similarity.

In one variation, when a participant makes a choice of preference between two base responses, a neural network (for modeling similarity across the set of response inputs)

can receive the received judgment input as an 'attack' score, which functions to reduce the likelihood that the two base responses presented in the user interface are the same. The system may record both the preference and the signal of the difference between the two base responses.

Alternatively, if the Participant feels the two base responses are the same, or nearly the same, then by selecting an option indicating the options are the same then the neural network can receive the received judgment input (indicating the similarity) as a 'support' score, reinforcing any original similarity score received from the unsupervised natural language computation added at the 'Micro Service' stage. In some variations, the option for indicating the options are similar can trigger a user interface update revealing a Likert scale where the Participant can indicate the extent of the 'similarity', which in turn feeds back as a 'support' score.

If a threshold similarity score is exceeded, or if a previous 'child response' score is depleted beneath a threshold, then the base response is either clustered, or made a new 'base response' accordingly, and the distribution system form comparative judgement is also altered accordingly, to achieve judgement equilibrium, across any groups where disparities are newly created.

The system may have User definable settings which enable the clustering threshold for base responses to be determined, but they are always a function of the multiple scoring interplay, of all of the Participant's combined signaling, as a group consensus.

Retrieving judgments may include timing the response time of a participant for each judgment. The time taken to decide between two options may be a signal for the strength of a participant's judgment. If a participant answers quickly that may indicate that the decision is easy so that the response may be weighted more strongly. The response times of judgments can then be applied in generating the response report of block S160 wherein S160 can include weighting participant judgment responses in part by duration of participant judgment responses. Other forms of a time limitation during the judgment stage can include enforcing a judgment time limit on a judgment of a participant. The judgment time limit can be configured for the problem request in block S120. For example, participants may be limited to selecting their preference within 30 seconds of base response options being presented.

While the method may prefer each participant to provide judgment on a full set of base response comparisons, the method can account for participants only providing judgment for a subset of the possible base response comparisons.

In one variation, base response comparisons may be randomly assigned and distributed across participants. In another variation, the full set of possible base response comparisons can be queued for distribution (preferably in a random or in an order to avoid judgment biasing) and then sequentially distributed as the judgment response interfaces request new base response comparisons for judgment.

Figure 13:
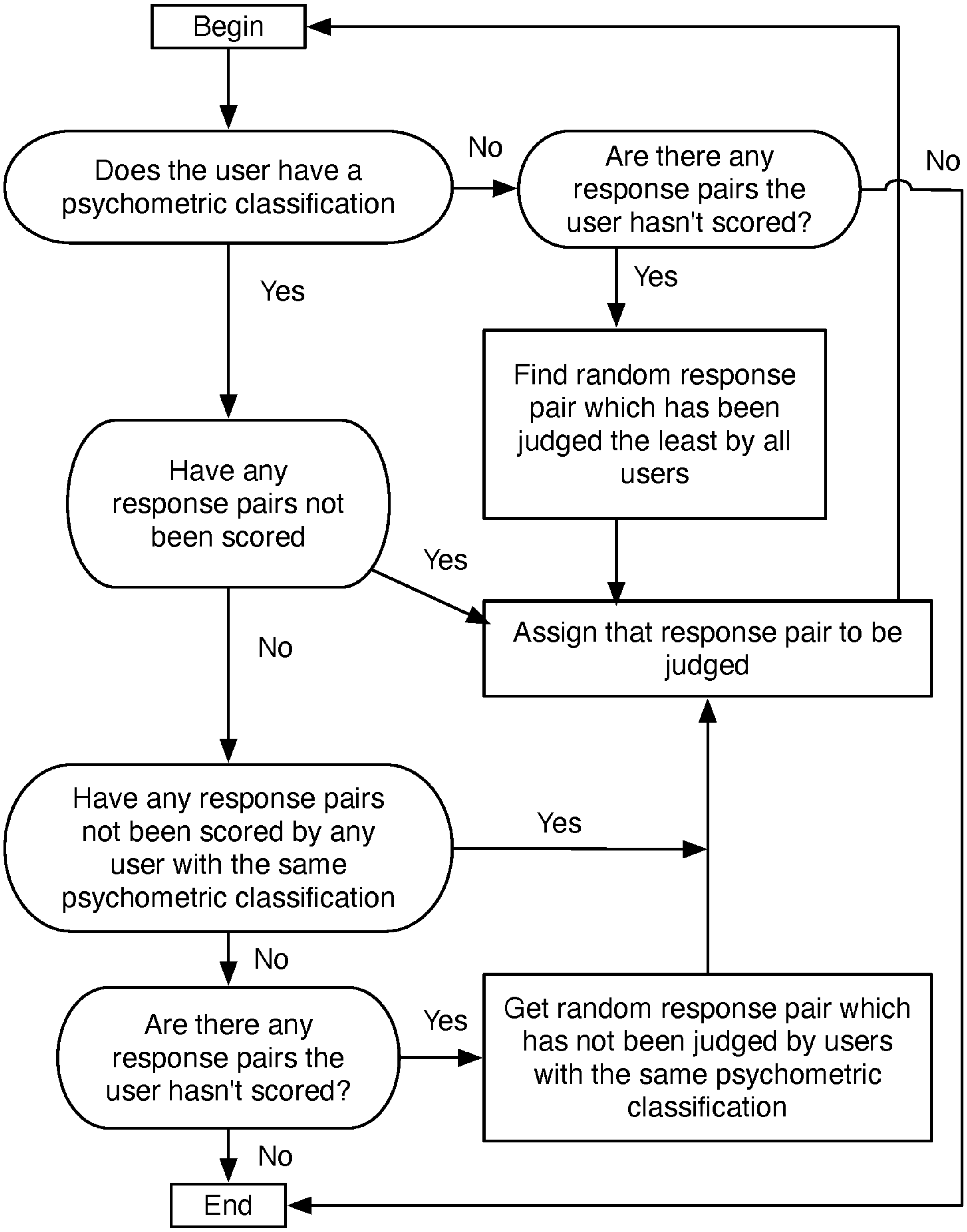
FIG. 13 is a flowchart representation of distributing pairwise judgments across participants.

Preferably, response comparisons are distributed across the possible comparisons to balance or at least avoid systematic biases through basic ordering of the comparisons. When users have a participant classification, the response comparisons may be distributed to participants so as to balance input across all participants and participants within a classification as shown in FIG. 13. When a participant is providing numerous judgments, the distribution of the response comparisons can be randomized (e.g., do you prefer option: B or D? A or B? B or C? A v C? C or D? A v D?) such that the participant preferably will not experience a systematic sequential ordering of response comparisons (e.g., do you prefer option: A or B? A v C? A v D? B or C? B or D? C or D?).

In one implementation of distributing base response comparisons, retrieving judgments can include selectively distributing base response comparisons across participants according to participant classification. Participant classifications that can impact distribution can include personality/psychometric classifications, organization classification, demographic classifications, and/or any suitable type of classifications. In one example, for each participant classification, the full set of comparisons can be distributed across participants of the same participant classification.

For a given participant providing judgments, base responses can be selected for comparison in response to base response comparisons previously or currently selected or distributed to participants of the same classification. This may function to normalize or balance judgments across different classifications. Various measurements or rules of participant classification representation may be used in balancing distribution. In one example, base response comparisons could be distributed across different participants based on participant psychometric classification, which can function to balance representation of different personality types. In another example, base response comparisons can be distributed across different participants based on organizational classification (e.g., manager, junior associate, etc.). The distribution can be set to be balanced. Alternatively, the distribution across participants can be biased to collect more judgment input from one or more classification.

Figure 19:
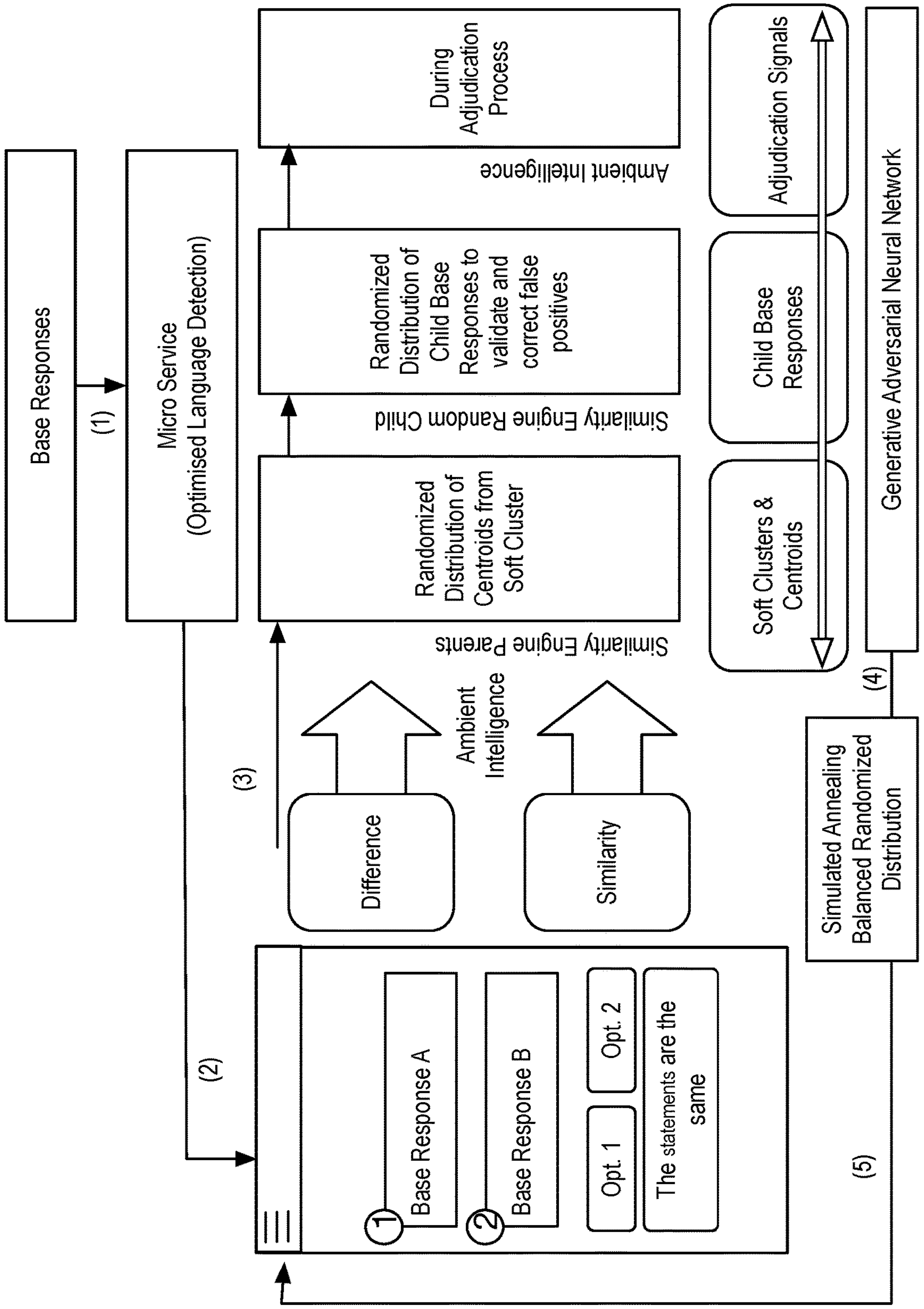
FIG. 19 is a schematic representation of machine generated soft clusters during consolidation.

FIG. 19 and in detailed FIGS. 20-23 shown one exemplary variation of consolidation and the optional incorporation of feedback. As shown in FIG. 19, the method can create machine generated soft clusters. In one variation, initially the system selects the appropriate language micro service by detecting the language used. The system may then undertake computational linguistics calculations of each base response, paired with each other base response, and any legacy base responses and data base detail to produce soft clusters of similar meaning with representative base responses or centroids, relevant to the current challenge (question or semantic proposition).

F1 sensitivity settings can be user selections such that the extent of clustering can be controlled. Where similarity thresholds are marginal, signaling potential false positives, the system may receive a user indication of the percentage of these for randomised re-introduction as base responses, to the Participants, for further ambient intelligence signals.

Figure 20:
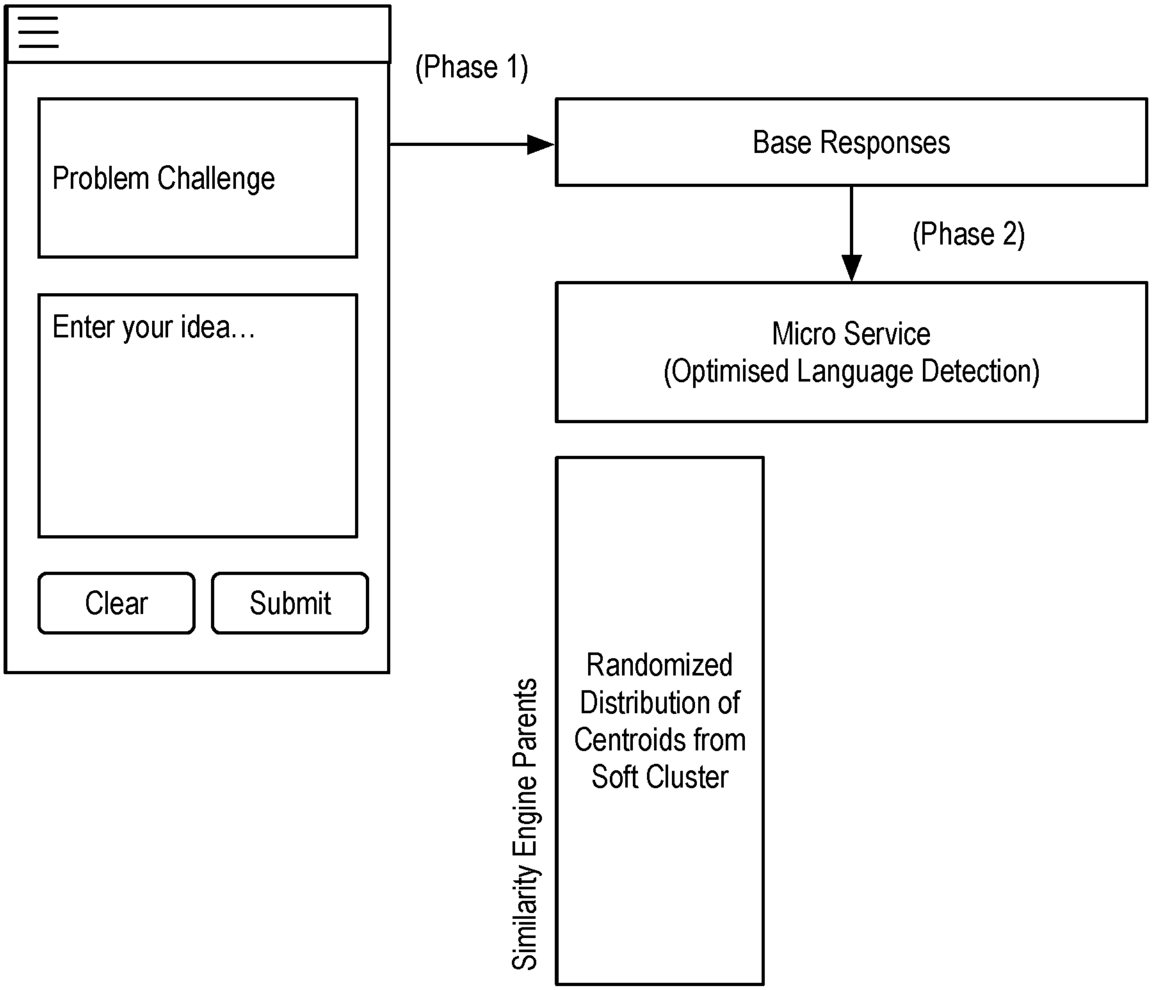

As shown in FIG. 20, in a first phase, Base responses can be stored with an allocated response ID. They may be stored until the end of the ideation process is signaled by the User.

In a second phase, at the close of ideation the response ID is classified as a response to the problem request (i.e., the "semantic proposition") for future file storage and the natural language micro service will detect the language used and engage the best amalgamation of computational language resources the system has available for pair-wise testing. This may include, where available, a matching process with any legacy clusters from the machine learning stages. The current problem request and the legacy problem request are linked for validity by their own pairwise similarity.

The operating system may pause in process for a short while and allocate cluster IDs which are identical for the response IDs in the same cluster, or otherwise individual.

Cluster IDs may be liquid at this stage as the composition of the clusters is liquid or 'Soft' until the end of the process.

Within the Clusters a 'moments' calculation is made of the binary similarity scores to determine the least squares value and thus the centroid for each Cluster which then represents the Cluster content as the 'Key Idea'.

Figure 21:
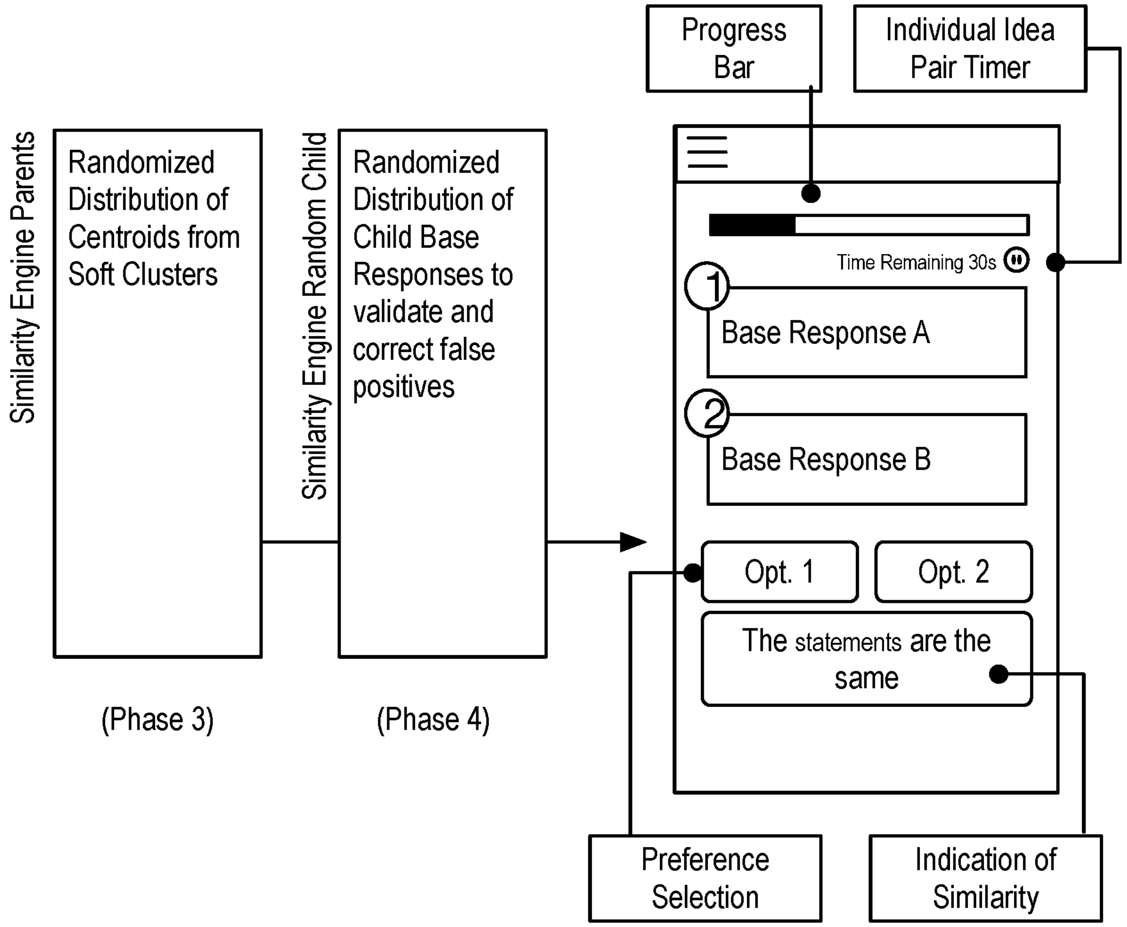

As shown in FIG. 21, in a third phase, the method may pause until the user opens a client device to a user interface configured for a judgement stage (adjudication stage). The system may defer to randomisation for the method of distribution, the system distributes by cluster ID in pair-wise for judgement by the participants.

In the fourth phase, in addition to the cluster IDs, which have been created using the computational linguistics model selected by the micro-service, the system is programmed to un-Cluster a percentage at random and re-introduce these with new, individual cluster IDs for aggregated Participant assessment over time, to validate the initial similarity computation and thereby correct 'false positives').

Figure 22:
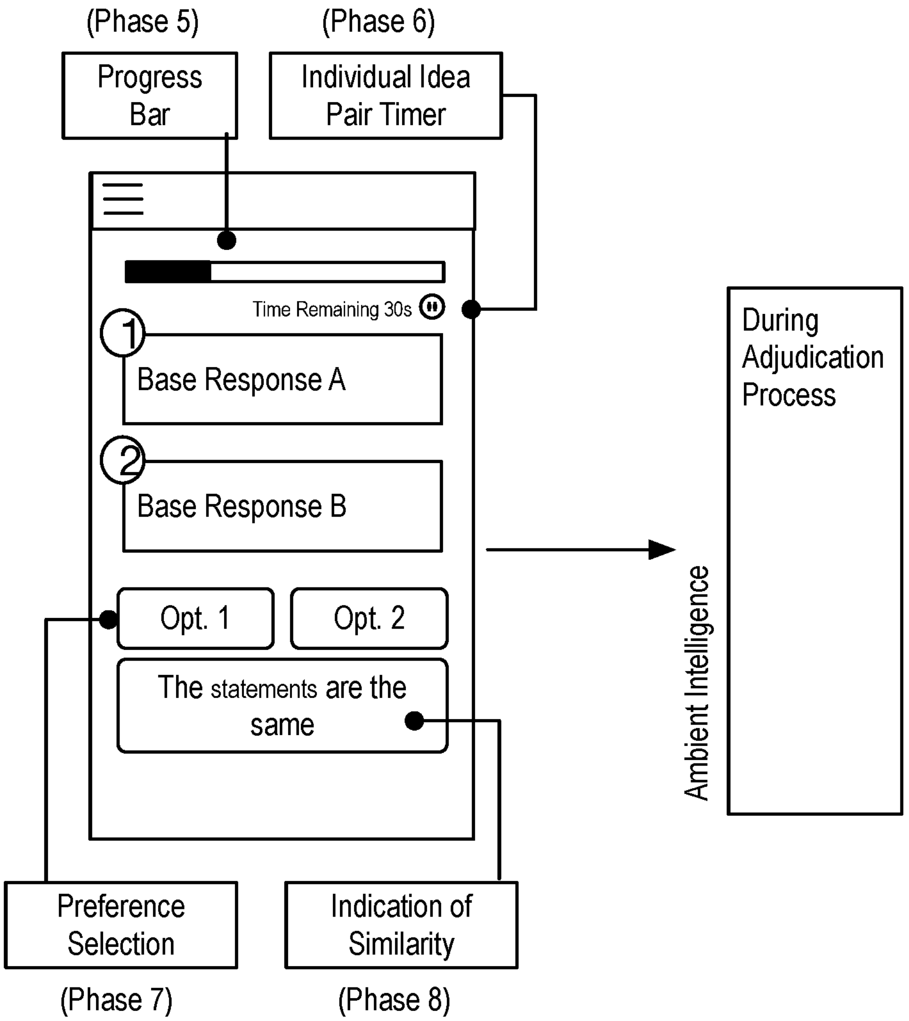

As shown in FIG. 22, in the fifth phase, each participant may receive the same amount of time for the batch of pairs they are to see. This can be a variable setting used for a number of reasons but primarily to capture a reflection of the intuitive nature of responses where this is relevant.

In a sixth phase, the batch timing may be augmented by an individual pair timer which forms part of the Report and forms the 'Coding' indicator of Intuition, —low times and longer times being an indication of fast and slow thinking respectively.

In a seventh phase, as participants make positive choices of preference, besides being recorded for preference reasons, this can also reduce the initial computational similarity score, and any subsequent ambient intelligence scoring, being received by the machine learning process, the neural network, as a signal that the two responses in question are indeed distinguishable for the purposes of adjudication.

In an eighth phase, where Participants do not make choices of preference, but instead use the scale buttons to indicate similarity, this increases the initial computational score, and any subsequent ambient scoring, being received by the machine learning process, the neural network, as a signal that the two responses are not distinguishable for the purposes of adjudication.

As shown in FIG. 23, in a ninth phase, the iterative changes in the system as it responds to the Participants signals means it is constantly recalibrating the needs of a fair statistical test, against a fluctuation in the absolute number of responses, represented by the cluster IDs, a process which is monitored by the system for computational optimal stopping, and represented graphically for the real-time and final Reporting stages.

This iteration can continue indefinitely if new participants are added, and may have no pre-determined end point from the point of an external assessment, though an artificial endpoint condition may additionally or alternatively be used.

There is therefore a generative adversarial competition in the scoring of preference, to additionally establish a response's individuality, and the scoring of similarity to increase the likelihood that it is not unique. In this way, the system can be an optimised generative neural network with a delta function that is formed by consensus based input collected from distributed communication with client devices of various users.

In a tenth phase, the system can monitor response preferences and also the oscillations of those preference signals and optimises the end point around that measurement and the measurement below.

In the same way, the system measures the frequency of responses which need to be checked for being false positives, using this information to augment the optimal stopping point, but which can also be seen graphically in the spaces between the vertical lines which record that feature happening, where lower probability responses are re-introduced, also in real time.

The two measurements therefore provide an optimised stopping point for the process.

As shown in FIG. 24 the system may use ambient intelligence signals to produce a probability ordered database, stored on the system for each clustered base response, and the Key Idea or Centroid as a measure of internal consistency.

The centroid can be a moments-based calculation where the idea has the least net difference with the other members in the Cluster.

Each centroid also has a probability score connecting it to the question or semantic proposition, which is itself a function of the scores flowing from the GANN.

The threshold values for the Cluster limit can also be varied to automate the number of clusters where a limit is required.

Besides use by the system itself, in support of the unsupervised computational linguistic scores provided by the micro service, this stored data memory, of lexical similarity, can also be retrieved and used to improve unsupervised computational linguistics by third parties, as 'digital fingerprints' for digital alerts, or matching algorithms for digital trace analysis, of any large, free text data bases.

Block S160, which includes generating a response report for the problem request, functions to process the judgments to produce a result. The response report is preferably a characterization of the various responses based on the retrieved judgments. The response report can be a static document but may alternatively be an interactive dashboard for exploring the results. The response report preferably includes a prioritized list of the set base responses. The base responses are preferably ordered according to the results of the judgment stage. Responses can be scored during the judgment stage based on the set of judgments across multiple pairwise comparisons. For individual judgments, the time to respond may be used to weight or augment how that judgment is evaluated. The results of the judgments may include participant normalization. For example, the results of the judgments may be normalized across participant classifications. If the full set of judgments includes more judgments from one participant classification than a second participant classification, the various responses may be normalized to balance representation of the various participant classifications. Any suitable ranking processing may additionally or alternatively be used.

In some variations, the consolidating of responses and the machine learning modeling of the method may be used in executing matching algorithms and/or generating digital fingerprints. The end consolidation of responses can be precise and complete. They may additionally be agnostic to language in some variations. The clusters may be: classified in relation to the originating problem challenge; internally structured by probabilities relating to each other separately on a binary level; and/or internally structured by probabilities related to the centroid. They may be used as matching algorithms for the interrogation of large data bases with massively improved performance in terms of validity as the probability Query/Originating Semantic proposition can be used to adjust the validity of the search or used to adjust the extent of the retrieve function.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more computer-readable mediums (e.g., a non-transitory computer readable medium) storing instructions that, when executed by the one or more computer processors, cause a computing platform to perform operations comprising those of the system or method described herein such as: receiving a problem request, collecting a set of response inputs to the problem request during an ideation stage, consolidating the set of responses to a set of base responses, retrieving judgments on base response comparisons of the base responses during a judgment stage, and generating a response report for the problem request.

Figure 26:
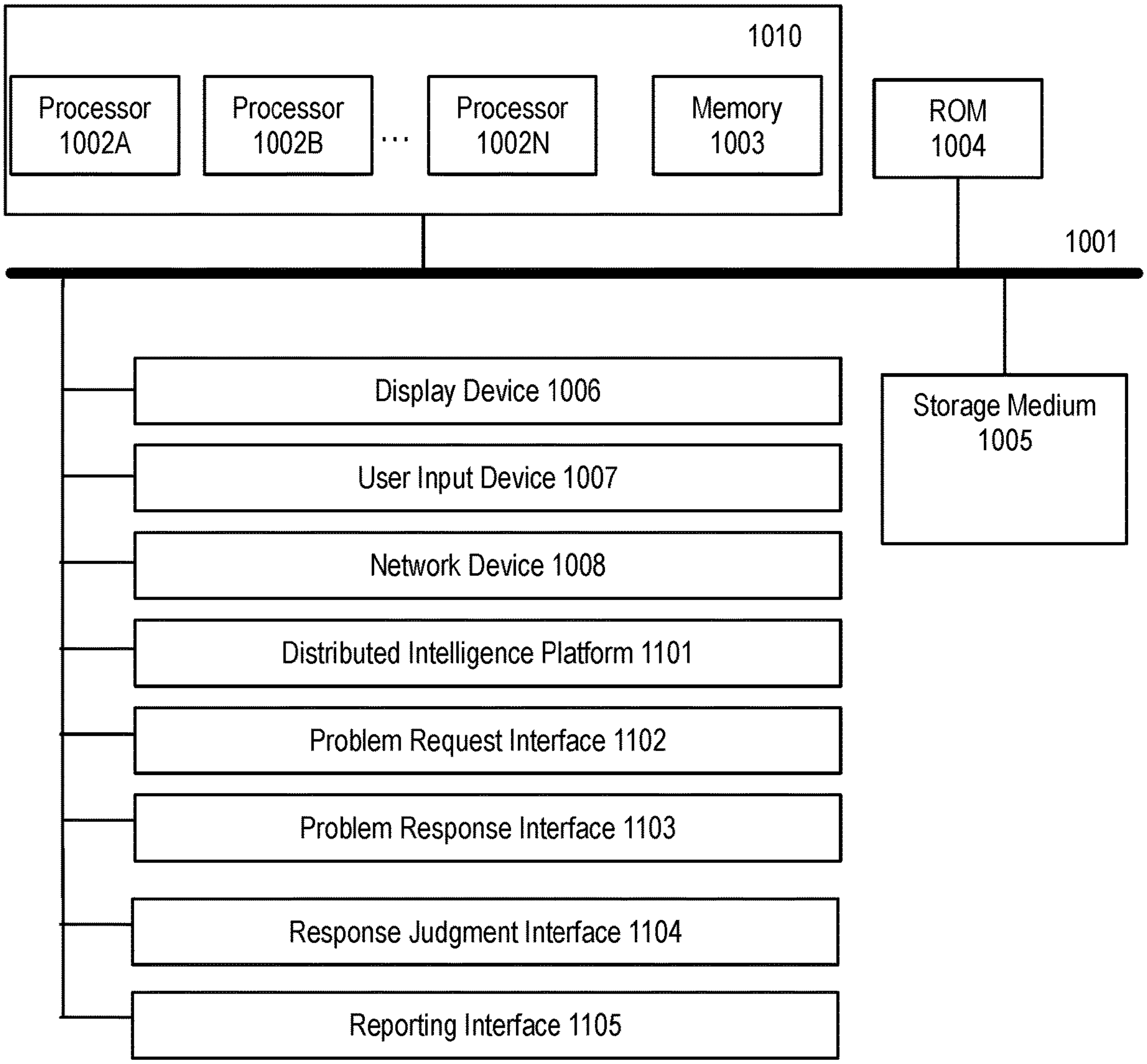
FIG. 26 is an exemplary system architecture that may be used in implementing the system and/or method.

FIG. 26 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting a distributed intelligence platform 1101, problem request interface 1102, problem response interface 1103, response judgment interface 1104, reporting interface 1105, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A method for distributed processing of natural language data across multiple client devices comprising:

at a computing platform comprising one or more processors configured to communicate with multiple client devices, collecting a set of natural language response inputs to a problem prompt from the multiple client devices;

at a similarity engine of the computing platform, consolidating, through processing of a machine learning model, the set of response inputs into a set of base responses, wherein consolidating the set of response inputs comprises:

generating, using the machine learning model, similarity modeling across the set of response inputs, segmenting, based on the similarity modeling, the set of response inputs into responses groups, computationally determining a representative base response for each response group by processing response inputs of each response group with a predictive language model and outputting a generated base response;

dynamically allocating pair-wise comparison tasks for comparisons of base responses to the multiple client devices;

communicating the pair-wise comparison tasks to judgement interfaces of multiple client devices;

receiving judgement input during a judgement stage in real-time from the multiple client devices, which comprises through a response judgement interface at a client device, retrieving judgement input that includes a preference selection of one of the two base responses or a similarity selection of the two base responses;

aggregating the received judgement input, wherein the computing platform monitors convergence of the aggregated preference rankings and automatically determines when to terminate the judgement stage based on the preference rankings reaching a stable state;

wherein during the judgement stage, dynamically updating, based on the judgement input received from the multiple client devices, the set of base responses for pair-wise comparison which includes automatically re-consolidating by updating processing of the response inputs by the machine learning model, wherein judgement input indicating preference between two base responses is received at the machine learning model as attack scoring that trains the machine learning model to reduce similarity modeling between the two base responses and judgement input indicating similarity is received at the machine learning model as support scoring that trains the machine learning model to reinforce similarity modeling between the base responses, wherein the aggregated judgement input provides training data that continuously improves the machine learning model, and wherein the improved machine learning model is applied to subsequent dynamic allocation of pair-wise comparison tasks and subsequent consolidation of base responses across the multiple client devices; and generating a response report on preference ranking of a resulting set of base responses based on collected judgement input.

2. The method of claim 1, wherein, based on the judgement input, reinforcing the similarity modeling output of the machine learning model.

3. The method of claim 1, wherein a response group of a base response is a group of responses segmented according to set consolidation threshold configuration within the computing platform.

4. The method of claim 1, wherein the number of base responses in the set of base responses is altered when automatically re-consolidating.

5. The method of claim 1, wherein automatically re-consolidating comprises resegmenting response inputs of a response group into two or more distinct base responses.

6. The method of claim 1, wherein when the set of base responses is altered during the judgement stage, the computing platform automatically recalibrates allocation of pair-wise comparison tasks across the multiple client devices to maintain judgement equilibrium across the altered set of base responses.

7. A non-transitory computer-readable medium storing instructions that, when executed by one or more computer processors of a computing platform, cause the computing platform to perform the operations:

at a computing platform configured to communicate with multiple client devices, collecting a set of natural language response inputs to a problem prompt from the multiple client devices;

at a similarity engine of the computing platform, consolidating, through processing of a machine learning model, the set of response inputs into a set of base responses, wherein consolidating the set of response inputs comprises:

generating, using the machine learning model, similarity modeling across the set of response inputs, segmenting, based on the similarity modeling, the set of response inputs into responses groups, computationally determining a representative base response for each response group by processing response inputs of each response group with a predictive language model and outputting a generated base response;

dynamically allocating pair-wise comparison tasks for comparisons of base responses to the multiple client devices;

communicating the pair-wise comparison tasks to judgement interfaces of multiple client devices;

receiving judgement input during a judgement stage in real-time from the multiple client devices, which comprises: through a response judgement interface at a client device, retrieving judgement input that includes a preference selection of one of the two base responses or a similarity selection of the two base responses;

aggregating the received judgement input, wherein the computing platform monitors convergence of the aggregated preference rankings and automatically determines when to terminate the judgement stage based on the preference rankings reaching a stable state;

wherein during the judgement stage, dynamically updating, based on the judgement input received from the multiple client devices, the set of base responses for pair-wise comparison which includes automatically re-consolidating by updating processing of the response inputs by the machine learning model, wherein judgment input indicating preference between two base responses is received at the machine learning model as attack scoring that trains the machine learning model to reduce similarity modeling between the two base responses and judgment input indicating similarity is received at the machine learning model as support scoring that trains the machine learning model to reinforce similarity modeling between the base responses, wherein the aggregated judgement input provides training data that continuously improves the machine learning model, and wherein the improved machine learning model is applied to subsequent dynamic allocation of pair-wise comparison tasks and subsequent consolidation of base responses across the multiple client devices; and generating a response report on preference ranking of a resulting set of base responses based on collected judgement input.

8. The non-transitory computer-readable medium of claim 7, wherein, based on the judgement input, reinforcing the similarity modeling output of the machine learning model.

9. The non-transitory computer-readable medium of claim 7, wherein a response group of a base response is a group of responses segmented according to set consolidation threshold configuration within the computing platform.

10. The non-transitory computer-readable medium of claim 7, wherein the number of base responses in the set of base responses is altered when automatically re-consolidating.

11. A system for distributed processing of natural language data across multiple client devices comprising:

one or more computer-readable mediums storing instructions that, when executed by the one or more computer processors, cause a computing platform to perform operations comprising:

at a computing platform in communication with multiple client devices, collecting a set of natural language response inputs to a problem prompt;

at a similarity engine of the computing platform, consolidating, through processing of a machine learning model, the set of response inputs into a set of base responses, wherein consolidating the set of response inputs comprises:

generating, using the machine learning model, similarity modeling across the set of response inputs, segmenting, based on the similarity modeling, the set of response inputs into responses groups, computationally determining a representative base response for each response group by processing response inputs of each response group with a predictive language model and outputting a generated base response;

dynamically allocating pair-wise comparison tasks for comparisons of base responses to the multiple client devices;

communicating the pair-wise comparison tasks to judgement interfaces of multiple client devices;

receiving judgement input during a judgement stage in real-time from the multiple client devices, which comprises: through a response judgement interface at a client device, retrieving judgement input that includes a preference selection of one of the two base responses or a similarity selection of the two base responses;

aggregating the received judgement input, wherein the computing platform monitors convergence of the aggregated preference rankings and automatically determines when to terminate the judgement stage based on the preference rankings reaching a stable state;

wherein during the judgement stage, dynamically updating, based on the judgement input received from the multiple client devices, the set of base responses for pair-wise comparison which includes automatically re-consolidating by updating processing of the response inputs by the machine learning model, wherein judgment input indicating preference between two base responses is received at the machine learning model as attack scoring that trains the machine learning model to reduce similarity modeling between the two base responses and judgment input indicating similarity is received at the machine learning model as support scoring that trains the machine learning model to reinforce similarity modeling between the base responses, wherein the aggregated judgement input provides training data that continuously improves the machine learning model, and wherein the improved machine learning model is applied to subsequent dynamic allocation of pair-wise comparison tasks and subsequent consolidation of base responses across the multiple client devices; and generating a response report on preference ranking of a resulting set of base responses based on collected judgement input.

12. The system of claim 11, wherein, based on the judgement input, reinforcing the similarity modeling output of the machine learning model.

13. The system of claim 11, wherein a response group of a base response is a group of responses segmented according to set consolidation threshold configuration within the computing platform.

14. The system of claim 11, wherein the number of base responses in the set of base responses is altered when automatically re-consolidating.

15. The system of claim 11, wherein automatically re-consolidating comprises resegmenting response inputs of a response group into two or more distinct base responses.

* * * * *